United States Patent
Chen et al.

(10) Patent No.: US 11,438,898 B2
(45) Date of Patent: Sep. 6, 2022

(54) BEAM INDICATION METHOD, APPARATUS AND SYSTEM

(71) Applicant: FUJITSU LIMITED, Kawasaki (JP)

(72) Inventors: Zhe Chen, Beijing (CN); Xin Wang, Beijing (CN); Lei Zhang, Beijing (CN); Lei Song, Beijing (CN); Guoyu Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/061,478

(22) Filed: Oct. 1, 2020

(65) Prior Publication Data

US 2021/0022128 A1 Jan. 21, 2021

Related U.S. Application Data

(63) Continuation of application No. PCT/CN2018/086391, filed on May 10, 2018.

(51) Int. Cl.
*H04W 72/04* (2009.01)
*H04W 16/28* (2009.01)

(52) U.S. Cl.
CPC ......... *H04W 72/046* (2013.01); *H04W 16/28* (2013.01)

(58) Field of Classification Search
CPC ... H04W 72/046; H04W 16/28; H04W 24/10; H04W 48/12; H04B 7/0695; H04L 5/001; H04L 5/0023; H04L 5/0098; H04L 5/0053

See application file for complete search history.

(56) References Cited

U.S. PATENT DOCUMENTS

| | | | |
|---|---|---|---|
| 2013/0155891 A1 | 6/2013 | Dinan | |
| 2015/0003384 A1* | 1/2015 | Kawasaki | H04B 7/26 370/329 |

(Continued)

FOREIGN PATENT DOCUMENTS

| | | |
|---|---|---|
| CN | 103945541 A | 7/2014 |
| CN | 106537804 A | 3/2017 |

(Continued)

OTHER PUBLICATIONS

Extended European Search Report with the supplementary European search report and the European search opinion issued by the European Patent Office for corresponding European Patent Application No. 18917767.8-1215, dated Apr. 16, 2021.

(Continued)

*Primary Examiner* — Fahmida S Chowdhury
(74) *Attorney, Agent, or Firm* — Myers Wolin, LLC.

(57) ABSTRACT

A beam indication method and apparatus and a system. The method includes: receiving activation signaling by a terminal equipment, the activation signaling activating at least one transmission; and transmitting or receiving the at least one transmission by the terminal equipment based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling. For a semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling are used (Continued)

301 a terminal equipment receives activation signaling, the activation signaling activating at least one transmission

302 the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling for transmission or reception, thereby solving the problem of ambiguity of beam indication in the above time period.

9 Claims, 5 Drawing Sheets

(56) References Cited

U.S. PATENT DOCUMENTS

| | | | |
|---|---|---|---|
| 2016/0021548 A1 | 1/2016 | Raghavan et al. | |
| 2018/0302889 A1* | 10/2018 | Guo | H04B 7/088 |
| 2019/0132828 A1* | 5/2019 | Kundargi | H04W 16/28 |
| 2019/0394082 A1* | 12/2019 | Cirik | H04W 72/046 |
| 2020/0358582 A1* | 11/2020 | Takeda | H04B 7/0695 |
| 2021/0091844 A1* | 3/2021 | Koskela | H04W 36/305 |
| 2021/0250917 A1* | 8/2021 | Takeda | H04L 5/0053 |

FOREIGN PATENT DOCUMENTS

| | | |
|---|---|---|
| JP | 2021-514123 A | 6/2021 |
| WO | 2019/160713 A1 | 6/2019 |

OTHER PUBLICATIONS

Nokia et al., "Remaining issues on beam management", Agenda Item: 7.1.2.2.3, 3GPP TSG-RAN WG1 Meeting #92bis, R1-1805104, Sanya, P.R. China, Apr. 16-20, 2018.

Nokia et al., "Feature lead summary on QCL", Agenda Item: 7.1.2.3.7, 3GPP TSG-RAN WG1 Meeting #92bis, R1-1805593, Sanya, P.R. China, Apr. 16-20, 2018.

3GPP TS 38.213 V15.1.0, 3rd Generation Partnership Project; Technical Specification Group Radio Access Network; NR; Physical layer procedures for control (Release 15), Mar. 2018.

Notice of Preliminary Rejection issued by the Korean Intellectual Property Office for corresponding Korean Patent Application No. 10-2020-7028950, dated Nov. 15, 2021, with an English translation.

The First Examination Report issued by the Patent Office of India for corresponding Indian Patent Application No. 202037041684, dated Dec. 2, 2021, with an English translation.

Notice of Reasons for Refusal issued by the Japan Patent Office for corresponding Japanese Patent Application No. 2020-555459, dated Oct. 26, 2021, with an English translation.

Fujitsu, "Ambiguities about beam indication and aperiodic CSI-RS triggering offset configuration in some cases", Agenda Item: 7.1.2.2.3, 3GPP TSG-RAN WG1 Meeting #92, R1-1801892, Athens, Greece, Feb. 26-Mar. 2, 2018.

Qualcomm Incorporated, Remaining Details on QCL, Agenda Item: 7.1.2.3.7, 3GPP TSG-RAN WG1 Meeting #92bis, R1-1804796, Sanya, China, Apr. 16-20, 2018.

Samsung, Miscellaneous corrections Change Request, 38.321, CR 0057, rev. 2, Current version: 15.1.0, 3GPP TSG-RAN WG2 Meeting #101 bis, R2-1806229, Sanya, China, Apr. 16-20, 2018.

International Search Report of the State Intellectual Property Office of the P.R. China issued for the PCT application No. PCT/CN2018/086391 dated Feb. 11, 2019, with an English translation.

Notice of Reasons for Refusal issued by the Japan Patent Office for corresponding Japanese Patent Application No. 2020-555459, dated Apr. 12, 2022, with an English translation.

Nokia et al., "Offline discussion summary on QCL", Agenda Item: 7.1.2.3.7, 3GPP TSG-RAN WG1 Meeting #92bis, R1-1805690, Sanya, People Republic of China, Apr. 16-20, 2018.

Notice of Last Preliminary Rejection issued by the Korean Intellectual Property Office for corresponding Korean Patent Application No. 10-2020-7028950, dated May 23, 2022, with an English translation.

\* cited by examiner

BEAM INDICATION METHOD, APPARATUS AND SYSTEM

CROSS REFERENCE TO RELATED APPLICATIONS

This application is a continuation application of International Application No. PCT/CN2018/086391, filed on May 10, 2018, the contents of which are incorporated herein by reference.

FIELD

This disclosure relates to the field of communication technologies, and in particular to a beam indication method, an apparatus thereof and a system.

BACKGROUND

In order to enhance the throughput and the coverage of a communication system at a high frequency band, a beam management mechanism is introduced into a new radio (NR) system when the carrier frequency is greater than 6 GHz.

For downlink, a beam indication mechanism of a data channel (PDSCH) is as follows: a network device configures a number of transmission configuration indication states (TCI states) via high-level signaling. Each state in the TCI states corresponds to one or more downlink reference signals, which are used to determine quasi co-location (QCL) of an antenna port.

When a field TCI-PresentInDCI of a control resource set (CORESET) is set to be "enabled", a terminal equipment assumes that a TCI field exists in a downlink control information (DCI) in the CORESET. And at the same time, if a scheduling offset is greater than a preset threshold Threshold-Sched-Offset, the terminal equipment determines the quasi co-location of the antenna port according to the TCI-State indicated by the TCI field.

When a field TI-PresentInDCI of a CORESET is set to be "disable", or a PDSCH is scheduled by DCI format 1_0, the terminal equipment assumes that there exists no a TCI field in the DCI on the CORESET. And at the same time, if the scheduling offset is greater than the preset threshold Threshold-Sched-Offset, a TCI state for receiving the PDSCH by the terminal equipment is identical to a TCI state applied to the CORESET.

For all the above scenarios, if the scheduling offset is less than the preset threshold Threshold-Sched-Offset, the TCI state for receiving the PDSCH by the terminal equipment is identical to a TCI state used by a CORESET with a lowest index in a latest slot.

For uplink data channels (PUSCHs), their beam indication mechanisms are as follows: for a PUSCH scheduled by DCI format 0_0, a terminal equipment transmits the PUSCH according to a spatial relationship of a PUCCH resource having a lowest index in an activated BWP of a current cell; and for a PUSCH scheduled by DCI format 0_1, a terminal equipment transmits the PUSCH according to a spatial relationship of a sounding reference signal (SRS) indicated by a reference signal resource indication (SRI) field in the DCI.

For uplink control channels (PUCCHs), their beam indication mechanisms are as follows: after PUCCH resources are configured via specific RRC signaling, spatial relationships of all the PUCCH resources will be indicated by a spatial relationship table, each entry in the table being provided by higher layer signaling PUCCH-Spatialrelation-info. When there is only one entry in the spatial relationship table, the entry takes effect directly. And when the spatial relationship table contains multiple entries, one of the entries is activated via media access control unit (MAC-CE) signaling for each PUCCH resource.

In addition, a semi-persistent scheduling mechanism is also introduced into an NR system. The semi-persistent scheduling (SPS) refers to that a network device semi-statically configures radio resources and periodically allocates the radio resources to a specific terminal equipment. An advantage of such a scheduling method is that the overhead of control signaling (PDCCH) may be saved. In the latest evolution of wireless system (Release 15), the function of semi-persistent scheduling is further enhanced. The existing semi-persistent scheduling mechanism is introduced as follows from the perspective of uplink and downlink, respectively.

For downlink, only data channels (PDSCHs) can be configured as semi-persistently scheduled. A network device (i.e. gNB) configures the periodicity of a semi-persistent scheduling, the number of hybrid automatic repeat request (HARQ) processes, and PUCCH resources used for the HARQ, via radio resource control (RRC) signaling. When the configuration of the downlink semi-persistent scheduling is accomplished, the scheduling cannot be used immediately, and shall be activated by using a DCI scrambled by configured scheduling radio network temporary identifier (CS-RNTI). And when the semi-persistent scheduling comes to an end, it shall be deactivated by using a DCI scrambled by CS-RNTI.

For uplink, data channels (PUSCHs) and channel state information feedback (CSI report) can be configured as semi-persistently scheduled.

For the uplink carrying a PUSCH, an SPS may be divided into two types: Type 1 PUSCH transmissions with a configured grant (Type 1) and Type 2 PUSCH transmissions with a configured grant (Type 2). Type 1 refers to that the uplink scheduled resources are configured only via RRC signaling, and the configured information includes frequency resource information, time resource information, periodicity information, and SRI, etc. The transmission of Type 1 does not need to be activated by DCI, and the transmission starts after the RRC configuration is completed. Type 2 refers to that a part of information of the uplink scheduling is configured via RRC signaling, and after the configuration is completed, the scheduling cannot be executed immediately and shall be activated by a DCI scrambled by CS-RNTI. When the uplink scheduling comes to an end, it must be deactivated by using the DCI scrambled by CS-RNTI.

For the uplink carrying channel state information feedback, the SPS may be divided into three types: PUCCH-based semi-persistent CSI reporting, PUSCH-based semi-persistent CSI reporting, and PUCCH-based periodic CSI reporting. The PUCCH-based semi-persistent CSI reporting needs to be activated and deactivated by using MAC-CE signaling after RRC configuration is completed; the PUSCH-based semi-persistent CSI reporting needs to be activated and deactivated by using DCI scrambled by semi-persistent scheduling-channel state information-radio network temporary identifier (SP-CSI-RNTI) after the RRC configuration is completed; and the PUCCH-based periodic CSI reporting takes effect directly after the RRC configuration is completed.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that after the network device configures the above-mentioned semi-persistent scheduling for the terminal equipment, the beam indication for the semi-persistent scheduling is ambiguous.

As shown in FIG. 1, the beam indications for the semi-persistent scheduling can be divided into three types of scenarios. Each scenario has a different activation mode for the semi-persistent scheduling, which is a DCI (CS-RNTI or SP-CSI-RNTI), MAC-CE or RRC. For each scenario, a first time of transmission (denoted as #1) after the activation signaling is triggered may be determined based on an existing beam indication mode. However, after the corresponding first time of transmission and before a next time of activation or deactivation signaling, which beam is to be used for transmitting or receiving is unknown to the terminal equipment.

In order to solve at least one of the above problems or other similar problems, embodiments of this disclosure provide a beam indication method, an apparatus thereof and a system.

According to a first aspect of the embodiments of this disclosure, there is provided a beam indication method, wherein the method includes:

receiving activation signaling by a terminal equipment, the activation signaling activating at least one transmission; and transmitting or receiving the at least one transmission by the terminal equipment based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

According to a second aspect of the embodiments of this disclosure, there is provided a beam indication method, wherein the method includes:

transmitting activation signaling by a network device to a terminal equipment, the activation signaling activating at least one transmission of the terminal equipment, so that the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

According to a third aspect of the embodiments of this disclosure, there is provided a beam indication apparatus, configured in a terminal equipment, wherein the apparatus includes:

a receiving unit configured to receive activation signaling, the activation signaling activating at least one transmission; and a transmission unit configured to transmit or receive the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

According to a fourth aspect of the embodiments of this disclosure, there is provided a beam indication apparatus, configured in a network device, wherein the apparatus includes:

a transmitting unit configured to transmit activation signaling to a terminal equipment, the activation signaling activating at least one transmission of the terminal equipment, so that the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

According to a fifth aspect of the embodiments of this disclosure, there is provided a terminal equipment, wherein the terminal equipment includes the apparatus as described in the third aspect.

According to a sixth aspect of the embodiments of this disclosure, there is provided a network device, wherein the network device includes the apparatus as described in the fourth aspect.

According to a seventh aspect of the embodiments of this disclosure, there is provided a communication system, including the terminal equipment as described in the fifth aspect and the network device as described in the sixth aspect.

According to another aspect of the embodiments of this disclosure, there is provided a computer program, wherein when the program is executed in a terminal equipment, the program causes a computer to carry out the method as described in the first aspect in the terminal equipment.

According to a further aspect of the embodiments of this disclosure, there is provided a storage medium storing a computer program, wherein the computer program causes a computer to carry out the method as described in the first aspect in a terminal equipment.

According to yet another aspect of the embodiments of this disclosure, there is provided a computer program, wherein when the program is executed in a network device, the program causes a computer to carry out the method as described in the second aspect in the network device.

According to still another aspect of the embodiments of this disclosure, there is provided a storage medium storing a computer program, wherein the computer program causes a computer to carry out the method as described in the second aspect in a network device.

An advantage of the embodiments of this disclosure exists in that in the embodiments of this disclosure, for a semi-persistently scheduled or periodically scheduled transmission, between activation signaling and deactivation signaling or a next time of activation signaling, identical spatial domain filters or transmission hypotheses, or respective spatial domain filters or transmission hypotheses determined by dynamically interpreting the activation signaling, are used for transmission or reception, thereby solving the problem of ambiguity of beam indication within the above time period.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1:
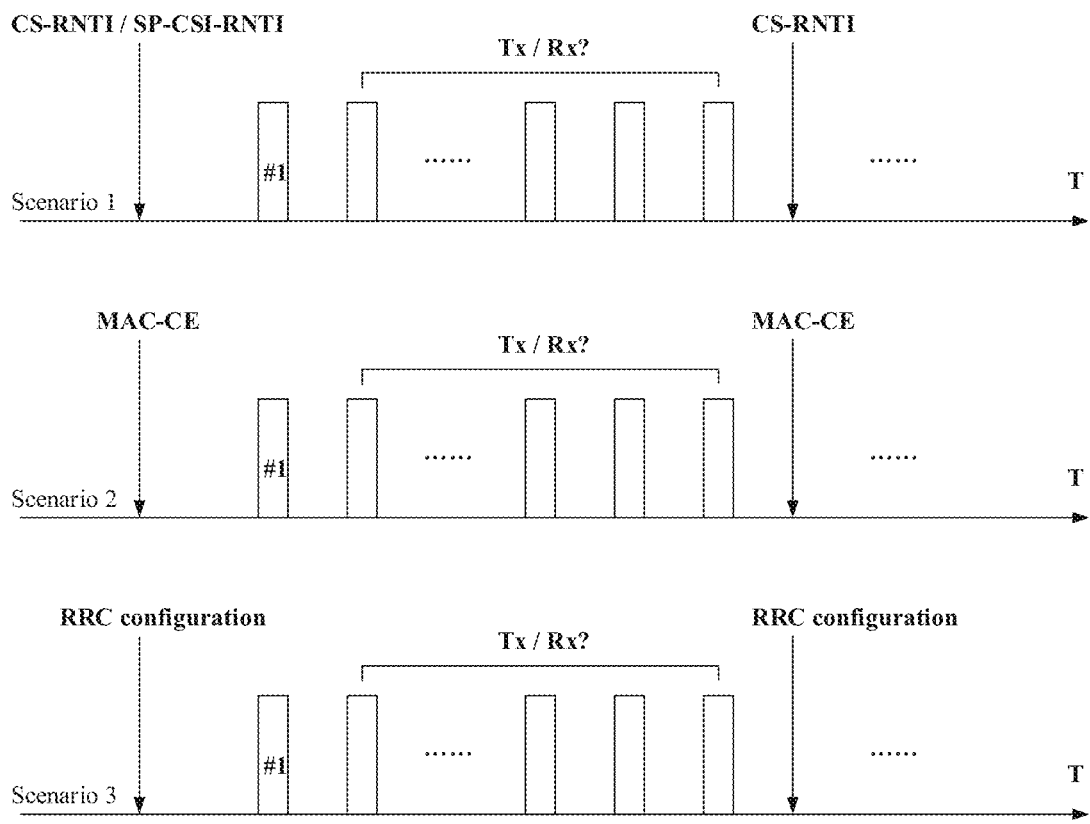
FIG. 1 is a schematic diagram of an existing scheduling scenario.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" refers to, for example, equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

Figure 2:
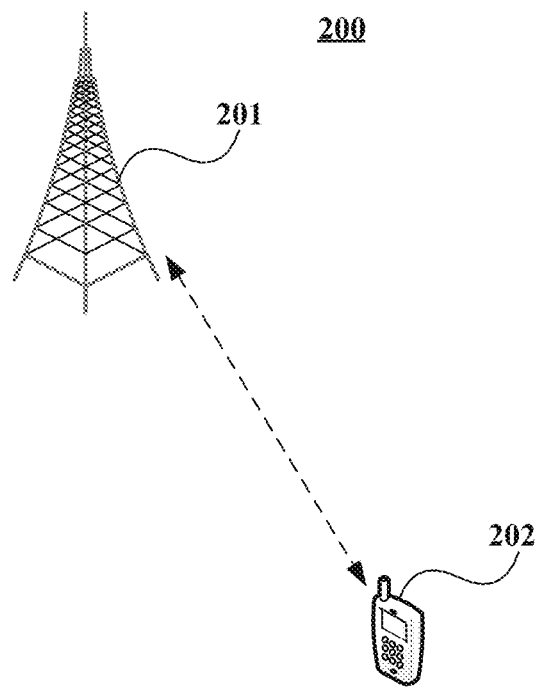
FIG. 2 is a schematic diagram of a communication system according to an embodiment of this disclosure.

FIG. 2 is a schematic diagram of a communication system of an embodiment of this disclosure, in which a case where a terminal equipment and a network device are taken as examples is schematically shown. As shown in FIG. 2, a communication system 200 may include a network device 201 and a terminal equipment 202. An example having one terminal equipment only is schematically given in FIG. 2. The network device 201 is, for example, a network device gNB in an NR system.

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC).

The terminal equipment 202 may transmit data to the network device 201, such as in a grant-free transmission mode. The network device 201 may receive data transmitted by one or more terminal equipments 202, and feedback information (such as ACK/NACK information) to the terminal equipment 202, and the terminal equipment 202 may acknowledge to end a transmission process according to the feedback information, or may further perform new data transmission, or may perform data retransmission.

Various embodiments of this disclosure shall be described below in with reference to the accompanying drawings. These embodiments are illustrative only, and are not intended to limit this disclosure.

Embodiment 1

Figure 3:
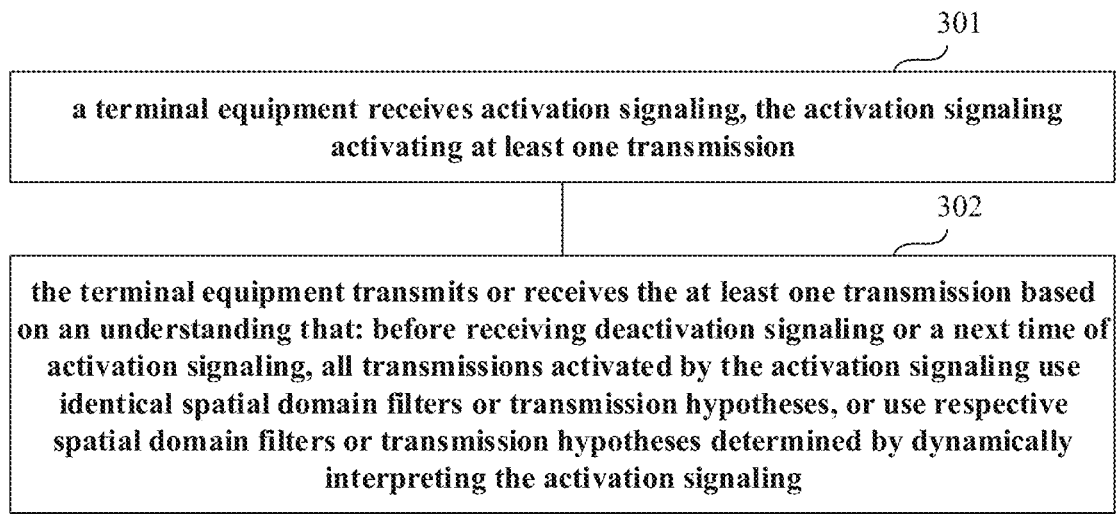
FIG. 3 is a schematic diagram of the beam indication method of Embodiment 1.

This embodiment provides a beam indication method, applicable to a terminal equipment. FIG. 3 is a schematic diagram of the beam indication method of this embodiment. Referring to FIG. 3, the method includes:

step 301: a terminal equipment receives activation signaling, the activation signaling activating at least one transmission; and step 302: the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

In this embodiment, the above activation signaling may be a DCI scrambled by CS-RNTI, or a DCI scrambled by SP-CSI-RNTI, furthermore, the above activation signaling may be an MAC-CE, or an RRC signaling; however, this embodiment is not limited thereto, and according to development of communication standards, the activation signaling may also be other signaling.

In this embodiment, the above at least one transmission may be a semi-persistently scheduled downlink transmission, such as a PDSCH, or may be a semi-persistently scheduled uplink transmission, such as a Type1 PUSCH transmission, a Type2 PUSCH transmission, PUSCH-based semi-persistent CSI reporting, or PUCCH-based semi-persistent CSI reporting; and it may also be periodic CSI based on uplink transmission, such as periodic CSI reporting based on a PUCCH. However, this embodiment is not limited thereto, and the above at least one transmission may also be other types of uplink transmissions or downlink transmissions.

In this embodiment, the using identical spatial domain filters or transmission hypotheses refers to that:

all transmissions activated by the above activation signaling are based on identical spatial domain filters or reference signals;

or, in a case where a scheduling distance between the activation signaling and a first transmission activated by the activation signaling is greater than a preset threshold, a first transmission in all transmissions activated by the activation signaling is based on the spatial domain filter or reference signal indicated by the activation signaling, and all transmissions other than the first transmission are based on spatial domain filters or reference signals identical to that of the first transmission;

or, in a case where a scheduling distance between the activation signaling and a first transmission activated by the activation signaling is less than a preset threshold, a first transmission after the preset threshold is based on the spatial domain filter or reference signal indicated by the activation signaling, and all transmissions after the preset threshold other than the first transmission are based on spatial domain filters or reference signals identical to that of the first transmission.

Here, the preset threshold is referred to as threshold-Sched-Offset in existing standards, and a setting method and principle thereof are identical to those in the existing standards, which shall not be described herein any further.

In this embodiment, the using respective spatial domain filters or transmission hypotheses determined by dynamically interpreting the activation signaling refers to that: the transmissions activated by the activation signaling are respectively based on the spatial domain filters or reference signals determined by interpreting the activation signaling at predetermined moments. Here, for each transmission, its predetermined moment is fixed, and manners of setting the respective predetermined moments of the transmissions are not limited in this embodiment.

The beam indication method of this embodiment shall be described below in conjunction with different implementations (scenarios).

Implementation 1:

In this implementation, the above at least one transmission is a semi-persistently scheduled downlink transmission, the activation signaling is a DCI scrambled by CS-RNTI, the DCI does not include a TCI field, and a scheduling distance between the activation signaling and a first transmission activated by the activation signaling (i.e. the scheduling offset described in Background) is greater than the preset threshold Threshold-Sched-Offset, then the terminal equipment may receive the semi-persistently scheduled downlink transmission according to any one of the following understandings that:

understanding 1: a TCI state of the first transmission activated by the above DCI is identical to a TCI state applied by a resource control set (CORESET) carrying the DCI, and transmissions activated by the above DCI other than the first transmission are based on reference signals used for determining quasi co-location (QCL) of antenna ports and identical to that of the first transmission; and understanding 2: a TCI state of each transmission activated by the above DCI is identical to a TCI state applied by a CORESET in a latest slot, the CORESET refers to a CORESET carrying the above DCI if the CORESET carrying the above DCI exists; and the CORESET refers to a CORESET with a lowest index in an activated carrier bandwidth (BWP) in the same cell as the above DCI if the CORESET carrying the above DCI does not exist.

This implementation shall be described below by taking that the semi-persistently scheduled downlink transmission is a PDSCH as an example.

In this implementation, in downlink transmission, after the network device completes configuration of semi-persistent scheduling parameters via high layer signaling (such as RRC signaling), the semi-persistently scheduled PDSCH is activated by the DCI scrambled by CS-RNTI. At this moment, the DCI does not include a TCI field, or it may be understood as that the DCI satisfies the following condition that: a format of this DCI is 1_0 or a high layer parameter TCI-PresentInDCI of the CORESET for transmitting the DCI is set to be "disabled". If a scheduling distance between the DCI and a first semi-persistently scheduled PDSCH activated by it is greater than Threshold-Sched-Offset, the following beam indication methods may be used for the semi-persistently scheduled PDSCHs activated by the DCI.

Method 1: the TCI state of the first PDSCH activated by the DCI is identical to the TCI state applied by the CORESET carrying the DCI. Before the PDSCHs being reactivated/deactivated by a next DCI (in the same cell as the above DCI) scrambled by CS-RNTI, reference signals used by the following PDSCHs activated by the DCI and a reference signal used by the first PDSCH activated by the DCI (in order to determine quasi co-location of antenna ports) are identical. In method 1, all reference signals used for determining quasi co-location of antenna ports of PDSCHs are identical before the PDSCHs being reactivated/deactivated by a DCI, thereby lowering complexity of the system.

Method 2: before the PDSCHs being reactivated/deactivated by a next DCI (in the same cell as the above DCI) scrambled by CS-RNTI, the terminal equipment assumes that a TCI state of each PDSCH activated by the DCI will be identical to a TCI state applied by a CORESET in a latest slot. This CORESET refers to that if a CORESET carrying the activation signaling exists, it is the CORESET carrying the activation instruction (a DCI scrambled by CS-RNTI); and if the above CORESET carrying the activation signaling does not exist, it refers to a CORESET with a lowest index in an activated BWP (in the same cell as the above DCI). In method 2, each reference signal used for determining quasi co-location of antenna ports of PDSCHs may dynamically follow a reference signal associated with the TCI state of CORESET. In a scenario where a beam direction changes frequently, there is no need to use DCI reactivation for multiple times to change the beam indication, thereby lowering overhead of the DCI.

Implementation 2

In this implementation, the above at least one transmission is a semi-persistently scheduled downlink transmission, and the activation signaling is a DCI scrambled by CS-RNTI, the DCI does not include a TCI field, and a scheduling distance between the activation signaling and a first transmission activated by the activation signaling is less than the preset threshold Threshold-Shed-Offset, then the terminal equipment may receive the semi-persistently scheduled downlink transmission according to any one of the following understandings that:

understanding 1: for the transmissions activated by the above DCI, a TCI state of a transmission before the preset threshold is identical to a TCI state of a CORESET with a lowest index in the activated BWP (in the same cell as the above DCI) in a latest slot, a TCI state of a first transmission after the preset threshold is identical to a TCI state of a CORESET carrying the DCI, and transmissions after the preset threshold other than the first transmission are based on reference signals used for determining quasi co-location (QCL) of antenna ports and identical to that of the first transmission;

understanding 2: for the transmissions activated by the above DCI, a TCI state of a transmission before the preset threshold is identical to a TCI state of a CORESET with a lowest index in the activated BWP (in the same cell as the above DCI) in a latest slot, and a TCI state of a transmission after the preset threshold is identical to a TCI state of a CORESET in a latest slot; the CORESET refers to a CORESET carrying the DCI if the CORESET carrying the DCI exists; or the CORESET refers to a CORESET with a lowest index in the activated BWP in the same cell as the above DCI if the CORESET carrying the DCI does not exist; and understanding 3: a TCI state of each transmission activated by the above DCI is identical to a TCI state of a CORESET with a lowest index in the activated BWP in the same cell as the above DCI in a latest slot.

This implementation shall be described below by taking that the semi-persistently scheduled downlink transmission is a PDSCH as an example.

In this implementation, in downlink transmission, after the network device completes configuration of semi-persistent scheduling parameters via high layer signaling (such as RRC signaling), the semi-persistently scheduled PDSCH is activated by a DCI scrambled by CS-RNTI. At this moment, the DCI does not include a TCI field, or it may be understood as that the DCI satisfies the following condition that: a format of this DCI is 1_0 or an RRC parameter TCI-PresentInDCI of a CORESET transmitting the DCI is set to be "disabled". If a scheduling distance between the DCI and a first semi-persistently scheduled PDSCH activated by it is less than Threshold-Sched-Offset, the following beam indication methods may be used for the semi-persistently scheduled PDSCH activated by the DCI.

Method 1: the terminal equipment assumes that a TCI state of each PDSCH (activated by the DCI) before Threshold-Sched-Offset is identical to a TCIstate of a CORESET with a lowest index in an activated BWP (in the same cell as the above DCI) in a latest slot. A TCI state of a first PDSCH activated by the DCI after Threshold-Sched-Offset is identical to a TCI state of a CORESET carrying the DCI. Before the PDSCHs being reactivated/deactivated by a next DCI (in the same cell as the above DCI) scrambled by CS-RNTI, a reference signal used by the first PDSCH activated by the DCI after Threshold-Sched-Offset and following PDSCHs (in order to determine quasi co-location of antenna ports) are identical. In method 1, all reference signals used for determining quasi co-location of antenna ports of PDSCHs are identical after Threshold-Sched-Offset and before the PDSCHs being reactivated/deactivated by a DCI, thereby lowering complexity of the system.

Method 2: the terminal equipment assumes that a TCI state of each PDSCH (activated by the DCI) before Threshold-Sched-Offset is identical to a TCI state of a CORESET with a lowest index in an activated BWP (in the same cell as the above DCI) in a latest slot. Before the PDSCHs being reactivated/deactivated by a next DCI (in the same cell as the above DCI) scrambled by CS-RNTI, a TCI state of each PDSCH activated by the DCI after Threshold-Sched-Offset is identical to a TCI state of a CORESET in a latest slot. This CORESET refers to a CORESET carrying an activation signaling (a DCI scrambled by CS-RNTI) if the CORESET carrying an activation signaling exists; and this CORESET refers to a CORESET with a lowest index in an activated BWP (in the same cell as the above DCI) if the CORESET carrying an activation instruction does not exist. In method 2, all reference signals used for determining quasi co-location of antenna ports of PDSCHs may dynamically follow the TCI state of the control channel after Threshold-Sched-Offset and before the PDSCHs being reactivated/deactivated by a DCI. In a scenario where a beam direction changes frequently, there is no need to use DCI reactivation for multiple times to change the beam indication, thereby lowering overhead of the DCI.

Method 3: the terminal equipment assumes that before the PDSCHs being reactivated/deactivated by a next DCI (in the same cell as the above DCI) scrambled by CS-RNTI, a TCI state of each PDSCH activated by the DCI is identical to a TCI state of a CORESET with a lowest index in an activated BWP (in the same cell as the above DCI) in the latest slot. In method 3, the terminal equipment receives PDSCHs according to default reference signals dynamically varying with receiving time. In a scenario where a beam direction changes frequently, there is no need to use DCI reactivation for multiple times to change the beam indication, thereby lowering overhead of the DCI.

Implementation 3:

In this implementation, the above at least one transmission is a semi-persistently scheduled downlink transmission, and the activation signaling is a DCI scrambled by CS-RNTI, the DCI includes a TCI field, and the scheduling distance between the activation signaling and a first transmission activated by the activation signaling is greater than the preset threshold Threshold-Sched-Offset, then the terminal equipment may receive the semi-persistently scheduled downlink transmission according to any one of the following understandings that:

understanding 1: a TCI state of a first transmission activated by the above DCI is determined by a TCI state in TCI-state on the same BWP as a BWP receiving a first transmission indicated by the TCI field of the DCI, and transmissions activated by the above DCI other than the first transmission are based on reference signals used for determining quasi co-location of antenna ports and identical to that of the first transmission;

understanding 2: a TCI state of each transmission activated by the above DCI is identical to a TCI-state in a latest slot on the same BWP as a BWP receiving the transmission indicated by the TCI field of the DCI.

This implementation shall be described below by taking that the semi-persistently scheduled downlink transmission is a PDSCH as an example.

In this implementation, in the downlink transmission, after the network device completes configuration of semi-persistent scheduling parameters via high layer signaling (such as RRC signaling), the semi-persistently scheduled PDSCH is activated by the DCI scrambled by CS-RNTI. At this moment, the DCI includes a TCI field, or it can be understood as that the DCI satisfies the following condition that: a format of this DCI is 1 and an RRC parameter TCI-PresentInDCI of the CORESET transmitting the DCI is set to be "enabled". If a scheduling distance between the DCI and a first semi-persistently scheduled PDSCH activated by it is greater than Threshold-Sched-Offset, the following beam indication methods may be used for the semi-persistently scheduled PDSCH activated by the DCI.

Method 1: a TCI state of a first PDSCH activated by the above DCI is determined by a TCI state in TCI-state (on the same BWP as a BWP receiving the PDSCH) indicated by the TCI field of the DCI. Before the PDSCHs being reactivated/deactivated by a next DCI (in the same cell as the above DCI) scrambled by CS-RNTI, reference signals used by following PDSCHs activated by the DCI and the first PDSCH activated by the DCI (in order to determine quasi co-location of antenna ports) are identical. In method 1, all reference signals used for determining quasi co-location of antenna ports of PDSCHs are identical before DCI reactivation, thereby lowering complexity of the system.

Method 2: before the PDSCHs being reactivated/deactivated by a next DCI (in the same cell as the above DCI) scrambled by CS-RNTI, for each PDSCH activated by the DCI, a TCI state of the terminal equipment is identical to a TCI-state in a latest slot (on the same BWP as a BWP receiving the PDSCH) indicated by the TCI field of the DCI. That is, TCI-stale includes two conditions: condition 1: being the same BWP as a BWP receiving the PDSCH; and condition 2: in the latest slot. In method 2, each reference signal used for determining quasi co-location of antenna ports of PDSCHs may dynamically follow the TCI state denoted by TCI-state. In a scenario where a beam direction changes frequently, there is no need to use DCI reactivation again, thereby lowering overhead of the DCI.

Implementation 4

In this implementation, the above at least one transmission is a semi-persistently scheduled downlink transmission, and the activation signaling is a DCI scrambled by CS-RNTI, the DCI includes a TCI field, and a scheduling distance between the activation signaling and a first transmission activated by the activation signaling is less than the preset threshold Threshold-Sched-Offset, then the terminal equipment may receive the semi-persistently scheduled downlink transmission according to any one of the following understandings that:

understanding 1: for transmissions activated by the above DCI, a TCI state of a transmission before the preset threshold is identical to a TCI state of a CORESET with a lowest index in the activated BWP (in the same cell as the above DCI) in a latest slot, a TCI state of a first transmission after the preset threshold is determined by a TCI-state in a BWP identical to the BWP receiving the first transmission indicated by the TCI field of the DCI, and transmissions after the preset threshold other than the first transmission are based on reference signals used for determining quasi co-location (QCL) of antenna ports and identical to that of the first transmission;

understanding 2: for transmissions activated by the above DCI, a TCI state of a transmission before the preset threshold is identical to a TCI state of a CORESET with a lowest index in the activated BWP (in the same cell as the above DCI) in a latest slot, and a TCI state of each transmission after the preset threshold is determined by a TCI-state in a BWP identical to the BWP receiving the first transmission indicated by the TCI field of the DCI; and understanding 3: a TCI state of each transmission activated by the above DCI is identical to a TCI state of a CORESET with a lowest index in the activated BWP in the same cell as the above DCI in a latest slot.

This implementation shall be described below by taking that the semi-persistently scheduled downlink transmission is a PDSCH as an example.

In this implementation, in downlink transmission, after the network device completes configuration of semi-persistent scheduling parameters via high layer signaling (such as RRC signaling), the semi-persistently scheduled PDSCH is activated by a DCI scrambled by CS-RNTI. At this moment, the DCI includes a TCI field, or it may be understood as that the DCI satisfies the following condition that: a format of this DCI is 1_1 and an RRC parameter TCI-PresentInDCI of the CORESET transmitting the DCI is set to be "enabled". If a scheduling distance between the DCI and a first semi-persistently scheduled PDSCH activated by it is less than Threshold-Sched-Offset, the following beam indication methods may be used for the semi-persistently scheduled PDSCH activated by the DCI.

Method 1: the terminal equipment assumes that a TCI state of each PDSCH (activated by the DCI) before Threshold-Sched-Offset is identical to a TCI state of a CORESET with a lowest index in the activated BWP (in the same cell as the above DCI) in a latest slot. A TCI state of a first PDSCH activated by the DCI after Threshold-Sched-Offset is determined by a TCI-stale (on the same BWP as a BWP receiving the PDSCH) indicated by a TCI field of the DCI. Before a PDSCH being reactivated/deactivated by a next DCI (in the same cell as the above DCI) scrambled by CS-RNTI, reference signals used by the first PDSCH activated by the DCI after Threshold-Sched-Offset and following PDSCHs (in order to determine quasi co-location of antenna ports) are identical. In method 1, all reference signals used for determining quasi co-location of antenna ports of PDSCHs are identical after Threshold-Sched-Offset and before DCI reactivation, thereby lowering complexity of the system.

Method 2: the terminal equipment assumes that a TCI state of each PDSCH (activated by the DCI) before Threshold-Sched-Offset is identical to a TCI state of a CORESET with a lowest index in an activated BWP (in the same cell as the above DCI) in the latest slot. Before PDSCHs being reactivated/deactivated by a next DCI (in the same cell as the above DCI) scrambled by CS-RNTI, the terminal equipment assumes that a TCI state of each PDSCH activated by the DCI after Threshold-Sched-Offset is determined by a TCI-state indicated by the TCI field of the DCI (on the same BWP as a BWP receiving the PDSCH) in a latest slot. In method 2, all reference signals used for determining quasi co-location of antenna ports of PDSCHs may dynamically follow the TCI state of the control channel after Threshold-Sched-Offset and before DCI reactivation. In a scenario where a beam direction changes frequently, there is no need to use DCI reactivation for multiple times to change the beam indication, thereby lowering overhead of the DCI.

Method 3: before PDSCHs being reactivated/deactivated by a next DCI (in the same cell as the above DCI) scrambled by CS-RNTI, the terminal equipment assumes that a TCI state of each PDSCH activated by the DCI is identical to a TCI state of a CORESET with a lowest index in an activated BWP (in the same cell as the above DCI) in the latest slot. In method 3, the terminal equipment receives PDSCHs according to default reference signals dynamically varying with receiving time. In a scenario where a beam direction changes frequently, there is no need to use DCI reactivation for multiple times to change the beam indication, thereby lowering overhead of the DCI.

Implementation 5

In this implementation, the above at least one transmission is a semi-persistently scheduled uplink transmission, the activation signaling is RRC signaling, and the above transmission is uplink transmission of Type 1, then the terminal equipment may transmit the semi-persistently scheduled uplink transmission according to any one of the following understandings that:

understanding 1: a spatial relationship of a first transmission activated by the RRC signaling is determined according to srs-ResouceIndicator in rrc-ConfiguredUplinkGrant in the RRC signaling, and a reference signal which denotes a spatial relationship and on which transmissions activated by the RRC signaling other than the first transmission are based is identical to a reference signal which denotes a spatial relationship and on which the first transmission is based;

understanding 2: a spatial relationship of a first transmission activated by the RRC signaling is determined according to srs-ResourceIndicator in r-ConfiguredUplinkGrant in the RRC signaling, and spatial domain filters used by transmissions activated by the RRC signaling other than the first transmission are identical to a spatial domain filter used by the first transmission;

understanding 3: a spatial relationship of each transmission activated by the RRC signaling is determined according to a spatial relationship in a latest slot indicating an SRS resource by srs-ResourceIndicator in rrc-ConfiguredUplinkGrant in the RRC signaling.

This implementation shall be described below by taking that the semi-persistently scheduled uplink transmission is Type 1 PUSCH transmission (PUSCH #1 in brief) as an example.

In this implementation, in the uplink transmission, after the network device completes configuration of semi-persistent scheduling parameters via high layer signaling (such as RRC signaling), the RRC signaling simultaneously activates the semi-persistently scheduled Type 1 PUSCH transmission, that is, Type 1 PUSCH transmission begins. The following beam indication methods may be used for PUSCH #1.

Method 1: the terminal equipment determines a spatial relationship of a first activated PUSCH #1 according to srs-ResourceIndicator in rrc-ConfiguredUplinkGrant, and before rrc-ConfiguredUplinkGrant is reconfigured, a reference signal which denotes a spatial relationship and on which transmitting a following (activated) PUSCH #1 is based is identical to a reference signal which denotes a spatial relationship and on which transmission of the first (activated) PUSCH #1 is based. In method 1, the reference signal on which transmission of PUSCH #1 is based is always kept unchanged before rrc-ConfiguredUplinkGrant is reconfigured, thereby lowering complexity of the system.

Method 2: the terminal equipment determines a spatial relationship of a first activated transmission according to srs-ResourceIndicator in rrc-ConfiguredUplinkGrant, and before rrc-ConfiguredUplinkGrant is reconfigured, a spatial domain filter for transmitting the first (activated) PUSCH #1 is identical to a spatial domain filter for transmitting a following (activated) PUSCH #1. In method 2, the spatial domain filter for transmitting the PUSCH #1 is always kept unchanged before rrc-ConfiguredUplinkGrant is reconfigured, thereby lowering complexity of the system.

Method 3: before rrc-ConfiguredUplinkGrant is reconfigured, a spatial relationship of each activated PUSCH #1 is determined based on a spatial relationship in a latest slot indicating an SRS resource by srs-ResourceIndicator. In method 3, the spatial domain filter for transmitting the PUSCH #1 dynamically varies along with a spatial relationship of the SRS resource indicated by srs-ResourceIndicator, and in a scenario where a beam direction changes frequently, there is no need to reconfigure RRC signaling, thereby lowering overhead of the DCI.

In a variant of this implementation, a configuration entry (also referred to as an information element), such as SRI-Present, may be added into rrc-ConfiguredUplinkGrant, for indicating whether srs-ResourceIndicator exists. For example, when the configuration entry is set to be "enabled", srs-ResourceIndicator will be present in rrc-ConfiguredUplinkGrant, and the terminal equipment may transmit the semi-persistently scheduled Type 1 PUSCH transmission based on any one of the above understandings; and when the configuration entry is set to be "disabled", there is no srs-ResourceIndicator in the rrc-ConfiguredUplinkGrant, the terminal equipment may transmit the semi-persistently scheduled uplink transmission based on any one of the following understandings that:

understanding 1: a spatial relationship of a first transmission activated by the above RRC signaling is determined according to a spatial direction of an uplink control channel of a lowest index in an activated BWP in the same cell as the uplink transmission, and a reference signal which denotes a spatial relationship and on which transmissions activated by the RRC signaling other than the first transmission are based is identical to a reference signal which denotes a spatial relationship and on which the first transmission is based;

understanding 2: a spatial relationship of a first transmission activated by the above RRC signaling is determined according to a spatial direction of an uplink control channel of a lowest index in an activated BWP in the same cell as the uplink transmission, and spatial domain filters used by transmissions activated by the above RRC signaling other than the first transmission are identical to a spatial domain filter used by the first transmission;

understanding 3: a spatial relationship of each transmission activated by the above RRC signaling is identical to a spatial relationship in a latest slot for an uplink control channel of a lowest index in an activated BWP in the same cell as the uplink transmission.

That is, in this variant, when the above configuration entry is set to be disabled, the following beam indication methods may be used for PUSCH #1.

Method 1: the terminal equipment determines a spatial relationship of a first activated PUSCH #1 according to a spatial direction (if any) of a PUCCH (in the same cell as the PUSCH #1 transmission) with a lowest index in an activated BWP. If a PUCCH resource has not been configured by dedicated RRC, the PUSCH #1 will follow a spatial direction of the PUCCH before being configured by the dedicated RRC, that is, it is identical to a spatial direction of Msg 3. Before rrc-ConfiguredUplinkGrant is reconfigured, a reference signal denoting a spatial relationship on which transmitting a following (activated) PUSCH #1 is based is identical to a reference signal denoting a spatial relationship on which transmitting a first (activated) PUSCH #1 is based. In method 1, the spatial relationship of Type 1 PUSCH transmission may be identical to that of the PUCCH, and at the same time, the reference signal denoting a spatial relation on which transmitting PUSCH is based is kept unchanged before rrc-ConfiguredUplinkGrant is reconfigured, thereby lowering complexity of the system.

Method 2: the terminal equipment determines a spatial relationship of a first activated PUSCH #1 according to a spatial direction (if any) of a PUCCH (in the same cell as the PUSCH #1 transmission) with a lowest index in an activated BWP. If a PUCCH resource has not been configured by dedicated RRC, the PUSCH #1 will follow a spatial direction of the PUCCH before being configured by the dedicated RRC, that is, it is identical to a spatial direction of Msg 3. Before rrc-ConfiguredUplinkGrant is reconfigured, a spatial domain filter of a next activated PUSCH #1 is identical to a spatial domain filter of a first activated PUSCH #1. In method 2, the spatial relationship of Type 1 PUSCH transmission may be identical to that of the PUCCH, and at the same time, the spatial domain filter used in transmitting the PUSCH is kept unchanged before rrc-ConfiguredUplinkGrant is reconfigured, thereby lowering complexity of the system.

Method 3: before rrc-ConfiguredUplinkGrant is reconfigured, a spatial relationship of each activated PUSCH will be based on a spatial relationship (if any) in a latest slot for a PUCCH with lowest index in the activated BWP (in the same cell as the PUSCH #1 transmission). If a PUCCH resource has not been configured by dedicated RRC, the spatial domain filter for transmitting the PUSCH #1 will be identical to the spatial domain filter of Msg 3. In method 3, the spatial relationship of Type 1 PUSCH transmission may be configured to be identical to that of the PUCCH. Hence, in a scenario where a beam direction changes frequently, there is no need to use RRC reconfiguration for multiple times, thereby lowering signaling overhead.

In another variant of this implementation, a field in srs-ResourceIndicator may be used to indicate whether an SRI exists. When it is determined according to a value of the field that the SRI does not exist, the terminal equipment may transmit the semi-persistently scheduled uplink transmission according to any one of the understandings in the previous variant. For example, a codepoint, such as "1111", in srs-ResourceIndicator, may be equated to that the SRI does not exist. And when srs-ResourceIndicator is set to be "1111", the beam indication methods in the previous variant may be used for PUSCH #1.

Implementation 6

In this implementation, the above at least one transmission is a semi-persistently scheduled uplink transmission, the transmission is an uplink transmission of type 2, the activation signaling is of a DCI format 0_0 scrambled by CS-RNTI, and the terminal equipment may transmit the semi-persistently scheduled uplink transmission based on any one of the following understandings:

understanding 1: a spatial relationship of a first transmission activated by the DCI is determined according to a spatial direction of an uplink control channel of a lowest index in an activated BWP in the same cell as the DCI, and a reference signal which denotes a spatial relationship and on which transmissions activated by the DCI other than the first transmission are based is identical to a reference signal which denotes a spatial relationship and on which the first transmission is based;

understanding 2: a spatial relationship of a first transmission activated by the DCI is determined according to a spatial direction of an uplink control channel of a lowest index in an activated BWP in the same cell as the DCI, and spatial domain filters used by transmissions activated by the DCI other than the first transmission are identical to a spatial domain filter used by the first transmission;

understanding 3: a spatial relationship of each transmission activated by the DCI is identical to a spatial relationship in a latest slot for an uplink control channel of a lowest index in an BWP in the same cell as the DCI.

This implementation shall be described below by taking that the semi-persistently scheduled uplink transmission is Type 2 PUSCH transmission (PUSCH #2 in brief) as an example.

In this implementation, in the uplink transmission, after the network device completes configuration of semi-persistent scheduling parameters via high layer signaling (such as RRC signaling), the Type 2 PUSCH transmissions are activated by a DCI format 0_0 scrambled by CS-RNTI, and the following beam indication methods may be used for PUSCH #2.

Method 1: the terminal equipment determines a spatial relationship of a first activated PUSCH #2 according to a spatial direction (if any) of a PUCCH (in the same cell as the above DCI) with a lowest index in an activated BWP. If a PUCCH resource has not been configured by dedicated RRC, the PUSCH #2 will follow a spatial direction of the PUCCH before being configured by the dedicated RRC, that is, it is identical to a spatial direction of Msg 3. Before the PUSCHs being reactivated by the DCI format 0_0 scrambled by CS-RNTI (in the same cell as the above DCI), a reference signal denoting a spatial relationship on which transmitting a following (activated) PUSCH #2 is based is identical to a reference signal denoting a spatial relationship on which transmitting a first (activated) PUSCH #2 is based. In method 1, the reference signal on which transmitting PUSCH #2 is based is kept unchanged before DCI reactivation, thereby lowering complexity of the system.

Method 2: the terminal equipment determines a spatial relationship of a first activated PUSCH #2 according to a spatial direction (if any) of a PUCCH (in the same cell as the above DCI) with a lowest index in an activated BWP. If a PUCCH resource has not been configured by dedicated RRC, the PUSCH #2 will follow a spatial direction of the PUCCH before being configured by the dedicated RRC, that is, it is identical to a spatial direction of Msg 3. Before the PUSCHs being reactivated by a DCI format 0_0 scrambled by CS-RNTI (in the same cell as the above DCI), a spatial domain filter for transmitting a first (activated) PUSCH #2 is identical to a spatial domain filter for transmitting a following PUSCH #2. In method 2, the spatial domain filter for transmitting the PUSCH #2 is kept unchanged before DCI reactivation, thereby lowering complexity of the system.

Method 3: before a PUSCH being reactivated by a DCI format 0_0 scrambled by CS-RNTI (in the same cell as the above DCI), a spatial relationship of each activated PUSCH #2 will be determined based on a spatial relationship (if any) in a latest slot for a PUCCH with lowest index in the activated BWP (in the same cell as the above DCI). If a PUCCH resource has not been configured by dedicated RRC, the spatial domain filter for transmitting the PUSCH #2 will be identical to the spatial domain filter of Msg 3. In method 3, the spatial relationship of the PUSCH #2 is identical to that of the PUCCH. Hence, in a scenario where a beam direction changes frequently, dynamic beam switch may be completed, and there is no need to use RRC reconfiguration for multiple times, thereby lowering signaling overhead.

Implementation 7

In this implementation, the above at least one transmission is a semi-persistently scheduled uplink transmission, the transmission is an uplink transmission of type 2, the activation signaling is of a DCI format 0_1 scrambled by CS-RNTI, and the terminal equipment may transmit the semi-persistently scheduled uplink transmission based on any one of the following understandings:

understanding 1: a first transmission activated by the DCI is transmitted according to a spatial relationship indicated by a carrier indicator field and an SRI field of the DCI, and a reference signal which denotes a spatial relationship and on which transmissions activated by the DCI other than the first transmission are based is identical to a reference signal which denotes a spatial relationship and on which transmitting the first transmission is based;

understanding 2: a first transmission activated by the DCI is transmitted according to a spatial relationship indicated by a carrier indicator field and an SRI field of the DCI, and spatial domain filters used by transmissions activated by the DCI other than the first transmission are identical to a spatial domain filter used by the first transmission;

understanding 3: a spatial relationship of each transmission activated by the DCI is identical to a spatial relationship in a latest slot indicated by the DCI.

This implementation shall be described below by taking that the semi-persistently scheduled uplink transmission is Type 2 PUSCH transmission (PUSCH #2 in brief) as an example.

In this implementation, in the uplink transmission, after the network device completes configuration of semi-persistent scheduling parameters via high layer signaling (such as RRC signaling), the Type 2 PUSCH transmissions are activated by the DCI format 0_1 scrambled by CS-RNTI, and the following beam indication methods may be used for PUSCH #2.

Method 1: the terminal equipment transmits a first activated PUSCH #2 according to a spatial relationship indicated by a carrier indicator field and an SRI field of the DCI, and before the PUSCHs being reactivated/deactivated by a DCI format 0_1 scrambled by CS-RNTI (in the same cell as the above DCI), a reference signal which denotes a spatial relationship and on which transmitting a following (activated) PUSCH #2 is based is identical to a reference signal which denotes a spatial relationship and on which transmitting the first (activated) PUSCH #2 is based. In method 1, the reference signal which denotes a spatial relationship and on which transmitting the PUSCH #2 is based is always kept unchanged before DCI reactivation, thereby lowering complexity of the system.

Method 2: the terminal equipment transmits a first activated PUSCH #2 according to a spatial relationship indicated by a carrier indicator field and an SRI field of the DCI, and before the PUSCHs being reactivated/deactivated by a DCI format 0_1 scrambled by CS-RNTI (in the same cell as the above DCI), a spatial domain filter for transmitting the first (activated) PUSCH #2 is identical to a spatial domain filter for transmitting a following PUSCH #2. In method 2, the spatial domain filter used for transmitting the PUSCH is always kept unchanged before DCI reactivation, thereby lowering complexity of the system.

Method 3: before the PUSCHs being reactivated/deactivated by a DCI format 0_1 scrambled by CS-RNTI in the same cell, a spatial relationship for transmitting each activated PUSCH #2 will be determined based on a spatial relationship of a needed SRS resource indicated by the DCI in a latest slot. In method 3, the spatial relationship of the PUSCH #2 may be dynamically associated with the spatial relationship of the SRS resource indicated by the DCI. Hence, in a scenario where a beam direction changes frequently, dynamic beam switch may be completed, and there is no need of multiple times of DCI reactivation, thereby lowering signaling overhead.

Implementation 8

In this implementation, the above at least one transmission is a semi-persistently scheduled uplink transmission and is a semi-persistent CSI report based on an uplink data channel (PUSCH), the activation signaling is of a DCI format 0_1 scrambled by SP-CSI-RNTI, and the terminal equipment transmits the semi-persistently scheduled uplink transmission based on any one of the following understandings:

understanding 1: a first transmission activated by the DCI is transmitted according to a spatial relationship indicated by a carrier indicator field and an SRI field of the DCI, and a reference signal which denotes a spatial relationship and on which transmissions activated by the DCI other than the first transmission are based is identical to a reference signal which denotes a spatial relationship and on which transmitting the first transmission is based;

understanding 2: a first transmission activated by the DCI is transmitted according to a spatial relationship indicated by a carrier indicator field and an SRI field of the DCI, and spatial domain filters used by transmissions activated by the DCI other than the first transmission are identical to a spatial domain filter used by the first transmission;

understanding 3: a spatial relationship of each transmission activated by the DCI is identical to a spatial relationship in a latest slot indicated by the DCI.

This implementation shall be described below by taking that the semi-persistently scheduled uplink transmission is a semi-persistent CSI report based on a PUSCH as an example.

In this implementation, after the network device completes configuration of semi-persistent scheduling parameters via high layer signaling (such as RRC signaling), the semi-persistent CSI report based on a PUSCH is activated by a DCI format 0_1 scrambled by SP-CSI-RNTI, and the following beam indication methods may be used for a PUSCH carrying the semi-persistent CSI report and activated by the DCI.

Method 1: the terminal equipment transmits a first activated PUSCH according to a spatial relationship indicated by a carrier indicator field and an SRI field of the DCI, and before the PUSCHs being reactivated by the DCI format 0_1 scrambled by CS-RNTI (in the same cell as the above DCI), a reference signal which denotes a spatial relationship and on which transmitting a following (activated) PUSCH is based is identical to a reference signal which denotes a spatial relationship and on which transmitting the first (activated) PUSCH is based. In method 1, the reference signal which denotes a spatial relationship and on which transmitting the PUSCH is based is always kept unchanged before DCI reactivation, thereby lowering complexity of the system.

Method 2: the terminal equipment transmits a first activated PUSCH according to a spatial relationship indicated by a carrier indicator field and an SRI field of the DCI, and before the PUSCHs being reactivated by a DCI format 0_1 scrambled by CS-RNTI (in the same cell as the above DCI), a spatial domain filter used for transmitting the first (activated) PUSCH is identical to a spatial domain filter used for transmitting a following PUSCH. In method 2, the spatial domain filter used for transmitting the PUSCH is always kept unchanged before DCI reactivation, thereby lowering complexity of the system.

Method 3: before the PUSCHs being reactivated by a DCI format 0_1 scrambled by CS-RNTI in the same cell, a spatial relationship of each activated PUSCH will be determined based on a spatial relationship indicated by a DCI in a latest slot. In method 3, the spatial relationship of the PUSCH may be associated dynamically with the spatial relationship indicated by the DCI. Hence, in a scenario where a beam direction changes frequently, dynamic beam switch may be completed, and there is no need of multiple times of DCI reactivation, thereby lowering signaling overhead.

Implementation 9

In this implementation, the above at least one transmission is a semi-persistently scheduled uplink transmission and is a semi-persistent CSI report based on an uplink control channel (PUCCH), the activation signaling is an MAC-CE, and the terminal equipment transmits the semi-persistently scheduled uplink transmission based on any of the following understandings:

understand 1: a first transmission activated by the MAC-CE is transmitted according to a spatial relationship of a control channel configured by RRC, and a reference signal which denotes a spatial relationship and on which transmissions activated by the MAC-CE other than the first transmission are based is identical to a reference signal which denotes a spatial relationship and on which transmitting the first transmission is based;

understand 2: a first transmission activated by the MAC-CE is transmitted according to a spatial relationship of a control channel configured by RRC, and spatial domain filters used by transmissions activated by the MAC-CE other than the first transmission are identical to a spatial domain filter used by the first transmission;

understand 3: a spatial relationship of each transmission activated by the MAC-CE is identical to a spatial relationship of an applied associated control channel in a latest slot.

This implementation shall be described below by taking that the semi-persistently scheduled uplink transmission is a semi-persistent CSI report based on a PUCCH as an example.

In this implementation, after the network device completes configuration of semi-persistent scheduling parameters via high layer signaling (such as RRC signaling), the semi-persistent CSI report based on a PUCCH is activated by MAC-CE signaling, and the following beam indication methods may be used for a PUCCH carrying the semi-persistent CSI report and activated by the MAC-CE signaling.

Method 1: the terminal equipment transmits a first activated PUCCH according to a spatial relationship configured by RRC, and before the PUCCHs being reactivated by MAC-CE signaling, a reference signal which denotes a spatial relationship and on which transmitting the first PUCCH is based is identical to a reference signal which denotes a spatial relationship and on which transmitting a following PUCCH is based. In method 1, a reference signal which denotes a spatial relationship and on which transmitting the PUCCH is based is always kept unchanged before MAC-CE reactivation, thereby lowering complexity of the system.

Method 2: the terminal equipment transmits the first PUCCH according to a spatial relationship configured by RRC, and before the PUCCHs being reactivated by MAC-CE signaling, a spatial domain filter used for transmitting the first PUCCH is identical to a spatial domain filter used for transmitting a following PUCCH. In method 2, a spatial domain filter used for transmitting the PUCCH is always kept unchanged before MAC-CE reactivation, thereby lowering complexity of the system.

Method 3: before MAC-CE signaling reactivation, a spatial relationship of each activated PUCCH will be determined based on an activated spatial relationship in a latest slot. If the spatial relationship is not activated, the spatial relationship may be determined according to a preset method, such as being determined according to a first entry in a configured spatial relationship table. In method 3, a spatial relationship of the activated PUCCH will dynamically vary along with the MAC-CE signaling or a default indication (according to the first entry in the configured spatial relationship table). Hence, in a scenario where a beam direction changes frequently, dynamic beam switch may be completed, and there is no need of multiple times of MAC-CE reactivation, thereby lowering signaling overhead.

Implementation 10

In this implementation, the above at least one transmission is a semi-persistently scheduled uplink transmission and is a semi-persistent CSI report based on an uplink control channel (PUCCH), the activation signaling is an MAC-CE, the terminal equipment is switched over from a first BWP to another BWP and is switched back to the first BWP, and the terminal equipment may transmit the semi-persistently scheduled uplink transmission based on any one of the following understandings:

understanding 1: a first transmission activated by the MAC-CE is transmitted according to a spatial relationship of a control channel configured by RRC, and a reference signal which denotes a spatial relationship and on which transmissions activated by the MAC-CE other than the first transmission are based is identical to a reference signal which denotes a spatial relationship and on which the first transmission is based;

understanding 2: a first transmission activated by the MAC-CE is transmitted according to a spatial relationship of a control channel configured by RRC, and spatial domain filters used by transmissions activated by the MAC-CE other than the first transmission are identical to a spatial domain filter used by the first transmission;

understanding 3: a spatial relationship of each transmission activated by the MAC-CE is identical to a spatial relationship of an applied associated control channel in a latest slot;

understanding 4: a first transmission activated by the MAC-CE is transmitted according to a spatial relationship for recently transmitting the transmission on the first BWP, and a reference signal which denotes a spatial relationship and on which transmissions activated by the MAC-CE other than the first transmission are based is identical to a reference signal which denotes a spatial relationship and on which the first transmission is based;

understanding 5: a first transmission activated by the MAC-CE is transmitted according to a spatial relationship for recently transmitting the above transmission on the first BWP, and spatial domain filters used by transmissions activated by the MAC-CE other than the first transmission are identical to a spatial domain filter used by the first transmission.

This implementation shall be described below by taking that the semi-persistently scheduled uplink transmission is a semi-persistent CSI report based on a PUCCH as an example.

In this implementation, after the network device completes configuration of semi-persistent scheduling parameters via high layer signaling (such as RRC signaling), the semi-persistent CSI report based on a PUCCH is activated by MAC-CE signaling. The terminal equipment is switched over from an original BWP (referred to as a first BWP) to another BWP, and at this moment, transmission of an originally-activated semi-persistent PUCCH (i.e. a PUCCH carrying the semi-persistent CSI report) is suspended. When the terminal equipment is switched over from another BWP back to the original BWP, the transmission of the semi-persistent PUCCH is recovered, and the following beam indication methods may be used for the PUCCH carrying the semi-persistent CSI report, activated by the MAC-CE signaling and recovered after the terminal equipment is switched over back to the original BWP.

Method 1: the terminal equipment transmits a first activated PUCCH according to a spatial relationship configured by RRC, and before the PUCCHs being reactivated by the MAC-CE signaling, a reference signal which denotes a spatial relationship and on which transmitting the first PUCCH is based is identical to a reference signal which denotes a spatial relationship and on which transmitting a following (activated) PUCCH is based. In method 1, a reference signal which denotes a spatial relationship and on which transmitting the PUCCH is based is always kept unchanged before MAC-CE reactivation, thereby lowering complexity of the system.

Method 2: the terminal equipment transmits the first activated PUCCH according to a spatial relationship configured by RRC, and before the PUCCHs being reactivated by the MAC-CE signaling, a spatial domain filter used for transmitting the first (activated) PUCCH is identical to a spatial domain filter used for transmitting a following (activated) PUCCH. In method 2, a spatial domain filter used for transmitting the PUCCH is always kept unchanged before MAC-CE reactivation, thereby lowering complexity of the system.

Method 3: before MAC-CE signaling reactivation, a spatial relationship of each activated PUCCH will be determined based on an activated spatial relationship in a latest slot. If the spatial relationship has not been activated, the spatial relationship may be determined according to a preset action, such as being determined according to a first entry in a configured spatial relationship table. In method 3, a reference signal which denotes a spatial relationship and on which transmitting the PUCCH is based will dynamically vary along with the MAC-CE signaling or a default indication (according to the first entry in the configured spatial relationship table). Hence, in a scenario where a beam direction changes frequently, dynamic beam switch may be completed, and there is no need of multiple times of MAC-CE reactivation, thereby lowering signaling overhead.

Method 4: the terminal equipment transmits the first PUCCH according to a spatial relationship on which recently transmitting the semi-persistent PUCCH (before being suspended) on the original BWP is based, and before the PUCCHs being reactivated by the MAC-CE signaling, a reference signal which denoting a spatial relationship and on which transmitting the first PUCCH is based is identical to a reference signal which denoting a spatial relationship and on which transmitting a following PUCCH is based. In method 4, after the terminal equipment is switched over back to the original BWP, a reference signal which denoting a spatial relationship and on which transmitting the PUCCH is based is identical to that before the switch, thereby ensuring consistence of the transmission direction of the PUCCH during BWP switch.

Method 5: the terminal equipment transmits the first activated PUCCH according to a reference signal which denoting a spatial relationship and on which recently transmitting the semi-persistent PUCCH (before being suspended) on the original BWP is based, and before the PUCCHs being reactivated by the MAC-CE signaling, a spatial domain filter for transmitting the first PUCCH is identical to a spatial domain filter for transmitting a following PUCCH. In method 5, after the terminal equipment is switched over back to the original BWP, the spatial domain filter used for transmitting the PUCCH is identical to that before the switch, thereby ensuring consistence of the transmission direction of the PUCCH during BWP switch.

Implementation 11

In this implementation, the above at least one transmission is a periodic CSI report based on uplink transmission, the activation signaling is RRC signaling, and the terminal equipment may transmit the uplink transmission based on any one of the following understandings:

understanding 1: a first transmission activated by the RRC signaling is transmitted according to a spatial relationship of a control channel configured by RRC and a reference signal which denotes a spatial relationship and on which transmissions activated by the RRC signaling other than the first transmission are based is identical to a reference signal which denotes a spatial relationship and on which the first transmission is based;

understanding 2: a first transmission activated by the RRC signaling is transmitted according to a spatial relationship of a control channel configured by RRC, and spatial domain filters used by transmissions activated by the RRC signaling other than the first transmission are identical to a spatial domain filter used by the first transmission;

understanding 3: a spatial relationship of each transmission activated by the RRC signaling is identical to an applied spatial relationship of an associated control channel in a latest slot.

This implementation shall be described below by taking that the periodic CSI report based on uplink transmission is a periodic CSI report based on a PUCCH as an example.

In this implementation, after the network device completes configuration of scheduling parameters via high layer signaling (such as RRC signaling), the periodic CSI report based on a PUCCH is activated by the RRC signaling, that is, the periodic CSI report based on a PUCCH is started. And the following beam indication methods may be used for the PUCCH.

Method 1: the terminal equipment transmits a first activated PUCCH according to a spatial relationship configured by RRC, and before being reconfigured by corresponding RRC signaling, a reference signal which denotes a spatial relationship and on which transmitting the first (activated) PUCCH is based is identical to a reference signal which denotes a spatial relationship and on which transmitting a following (activated) PUCCH is based. In method 1, a reference signal which denotes a spatial relationship and on which transmitting the PUCCH is based is always kept unchanged before reconfiguration of corresponding RRC signaling, thereby lowering complexity of the system.

Method 2: the terminal equipment transmits the first activated PUCCH according to a spatial relationship configured by RRC, and before being reconfigured by corresponding RRC signaling, a spatial domain filter used for transmitting the first (activated) PUCCH is identical to a spatial domain filter used for transmitting a following (activated) PUCCH. In method 2, a spatial domain filter used for transmitting the PUCCH is always kept unchanged before reconfiguration of corresponding RRC signaling, thereby lowering complexity of the system.

Method 3: before reconfiguration of corresponding RRC signaling, a spatial relationship of each activated PUCCH will be determined based on an applied spatial relationship of an associated control channel in a latest slot. If the spatial relationship has not been activated, the spatial relationship may be determined according to a preset action, such as being determined according to a first entry in a configured spatial relationship table. In method 3, a reference signal which denotes a spatial relationship and on which transmitting the PUCCH is based will dynamically vary along with the MAC-CE signaling or a default indication (according to the first entry in the configured spatial relationship table). Hence, in a scenario where a beam direction changes frequently, dynamic beam switch may be completed, and there is no need of use of multiple times of corresponding RRC signaling, thereby lowering signaling overhead.

In the above implementations 1-11, the beam indication method is described only from the perspective of the terminal equipment. However, understanding of beam indication are consistent for the terminal equipment and the network device.

The beam indication method of this embodiment is described above in conjunction with particular implementations (scenarios). However, this embodiment is not limited thereto, and the beam indication method of this embodiment may also be applicable to other scenarios. For example, the activation signaling may be other signaling than DCI, an MAC-CE and RRC. For another example, the activated transmission may be transmissions other than the semi-persistently scheduled downlink transmission, semi-persistently scheduled uplink transmission and CSI based on uplink transmission. Moreover, the above scenarios may further be combined in various ways according to particular implementations.

With the method of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 2

Figure 4:
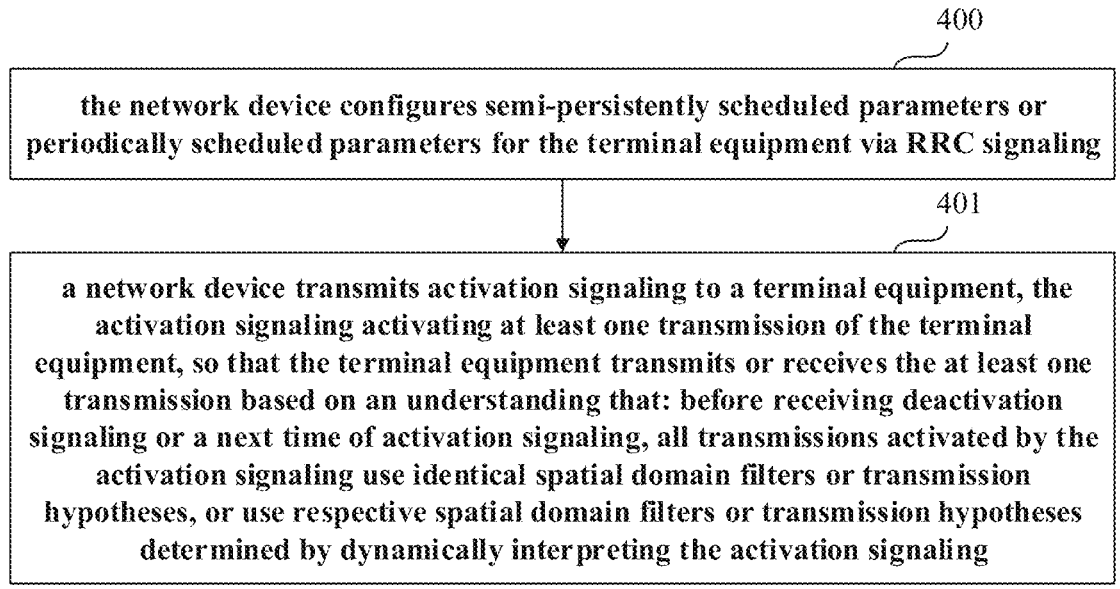
FIG. 4 is a schematic diagram of the beam indication method of Embodiment 2.

This embodiment provides a beam indication method, which is applicable to a network device, and is processing at a network side corresponding to the method of Embodiment 1, with contents identical to those in Embodiment 1 being not going to be described herein any further. FIG. 4 is a schematic diagram of the beam indication method of this embodiment. Referring to FIG. 4, the method includes:

step 401: a network device transmits activation signaling to a terminal equipment, the activation signaling activating at least one transmission of the terminal equipment, so that the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

In this embodiment, the activation signaling is, for example, DCI scrambled by CS-RNTI, or is a DCI scrambled by SP-CSI-RNTI, or is an MAC-CE, or is RRC signaling. As the activation signaling is described in detail in Embodiment 1, its contents are incorporated herein, and shall not be described herein any further.

In this embodiment, the above transmission is, for example, a semi-persistently scheduled downlink transmission (corresponding to implementations 1-4 in Embodiment 1), or is a semi-persistently scheduled uplink transmission (corresponding to implementations 5-10 in Embodiment 1), or is periodic channel state information (CSI) report based on uplink transmission (corresponding to implementation 11 in Embodiment 1). As the beam indication method in different scenarios has been described in detail in Embodiment 1, its contents are incorporated herein, and shall not be described herein any further.

In this embodiment, as shown in FIG. 4, the method may further include:

step 400: the network device configures semi-persistently scheduled parameters or periodically scheduled parameters for the terminal equipment via RRC signaling.

A particular configuration method is not limited in this embodiment. Therefore, after the network device completes the configuration of the above parameters via the above RRC signaling, the terminal equipment may perform corresponding transmission or reception according to the method of embodiment 1. The details have been described in Embodiment 1, and shall not be described herein any further.

In this embodiment, the above RRC signaling may include an information element rrc-ConfiguredUplinkGrant, and the information element rrc-ConfiguredUplinkGrant may include an information element used for indicating whether srs-ResourceIndicator exists. Therefore, corresponding to the first variant of implementation 5 of Embodiment 1, the terminal equipment may determine the beam indication accordingly.

In this embodiment, the above RRC signaling may further include an information element srs-ResourceIndicator, and the information element srs-ResourceIndicator may include a field used for indicating whether the SRI exists. Therefore, corresponding to the second variant of implementation 5 of Embodiment 1, the terminal equipment may determine the beam indication accordingly.

With the method of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 3

This embodiment provides a beam indication apparatus, configured in a terminal equipment. As principles of the apparatus for solving problems are similar to that of the method in Embodiment 1, reference may be made to the implementation of the method in Embodiment 1 for implementation of this apparatus, with identical contents being not going to be described herein any further.

Figure 5:
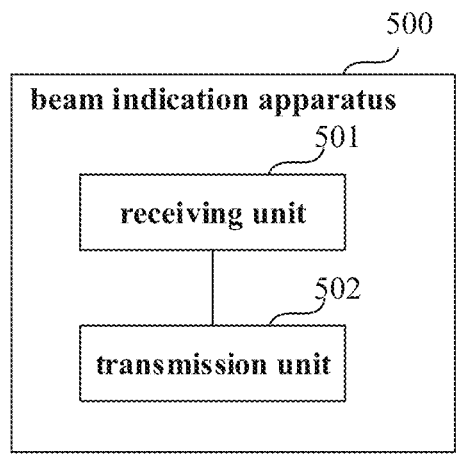
FIG. 5 is a schematic diagram of the beam indication apparatus of Embodiment 3.

FIG. 5 is a schematic diagram of the beam indication apparatus of this embodiment. As shown in FIG. 5, a beam indication apparatus 500 includes a receiving unit 501 and a transmission unit 502.

The receiving unit 501 is configured to receive activation signaling, the activation signaling activating at least one transmission; and the transmission unit 502 is configured to transmit or receive the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

In this embodiment, the activation signaling may be a DCI scrambled by CS-RNTI, or a DCI scrambled by SP-CSI-RNTI, or an MAC-CE, or RRC signaling, and details thereof are as described in Embodiment 1, and shall not be described herein any further.

In this embodiment, the transmission may be a semi-persistently scheduled downlink transmission, or a semi-persistently scheduled uplink transmission, or periodic channel state information (CSI) report based on an uplink transmission, and details thereof are as described in Embodiment 1, and shall not be described herein any further.

In this embodiment, the using identical spatial domain filters or transmission hypotheses refers to any one of the following that, all the transmissions activated by the activation signaling is based on identical spatial domain filters or reference signals;

in a case where a scheduling distance between the activation signaling and a first transmission activated by the activation signaling is greater than a preset threshold, a first transmission in all the transmissions activated by the activation signaling is based on a spatial domain filter or reference signal indicated by the activation signaling, and all transmissions other than the first transmission are based on spatial domain filters or reference signals identical to that of the first transmission; and in a case where a scheduling distance between the activation signaling and a first transmission activated by the activation signaling is less than a preset threshold, a first transmission after the preset threshold is based on a spatial domain filter or reference signal indicated by the activation signaling, and all transmissions after the preset threshold other than the first transmission are based on spatial domain filters or reference signals identical to that of the first transmission.

In this embodiment, the using respective spatial domain filters or transmission hypotheses determined by dynamically interpreting the activation signaling refers to that each transmission activated by the activation signaling is respectively based on spatial domain filters or reference signals determined by interpreting the activation signaling at a predetermined time.

In one implementation, the transmission is a semi-persistently scheduled downlink transmission, the activation signaling is a DCI scrambled by CS-RNTI, the DCI containing no a TCI field, a scheduling distance between the activation signaling and a first transmission activated by the activation signaling is greater than a preset threshold, and the transmission unit 502 receives the semi-persistently scheduled downlink transmission based on an understanding that:

a TCI state of a first transmission activated by the DCI is identical to a TCI state used by a resource control set (CORESET) carrying the DCI, and transmissions activated by the DCI other than the first transmission are based on a reference signal identical to that of the first transmission and used for determining quasi co-location of an antenna port; or a TCI state of each transmission activated by the DCI is identical to a TCI state used by a CORESET in a latest slot, the CORESET referring to a CORESET carrying the DCI if a CORESET carrying the DCI exists, or the CORESET referring to a CORESET of a lowest index in an activated bandwidth part (BWP) in the same cell as the DCI if a CORESET carrying the DCI does not exist.

In another implementation, the transmission is a semi-persistently scheduled downlink transmission, the activation signaling is a DCI scrambled by CS-RNTI, the DCI containing no a TCI field, a scheduling distance between the activation signaling and a first transmission activated by the activation signaling is less than a preset threshold, and the transmission unit 502 receives the semi-persistently scheduled downlink transmission based on an understanding that:

for transmissions activated by the DCI, a TCI state of transmissions before the preset threshold is identical to a TCI state of a CORESET of a lowest index in an activated BWP in a latest slot, a TCI state of a first transmission after the preset threshold is identical to a TCI state of a CORESET carrying the DCI, and transmissions after the preset threshold other than the first transmission are based on a reference signal identical to that of the first transmission and used for determining quasi co-location of an antenna port; or for transmissions activated by the DCI, a TCI state of transmissions before the preset threshold is identical to a TCI state of a CORESET of a lowest index in an activated BWP in a latest slot, a TCI state of transmissions after the preset threshold is identical to a TCI state of a CORESET in a latest slot, the CORESET referring to a CORESET carrying the DCI, or the CORESET referring to a CORESET of a lowest index in an activated BWP in the same cell as the DCI if the CORESET carrying the DCI does not exist; or a TCI state of each transmission activated by the DCI is identical to a TCI state of a CORESET of a lowest index in an activated BWP in a latest slot and in the same cell as the DCI.

In a further implementation, the transmission is a semi-persistently scheduled downlink transmission, the activation signaling is a DCI scrambled by CS-RNTI, the DCI containing a TCI field, a scheduling distance between the activation signaling and a first transmission activated by the activation signaling is greater than a preset threshold, and the transmission unit 502 receives the semi-persistently scheduled downlink transmission based on an understanding that:

a TCI state of a first transmission activated by the DCI is determined by a TCI state in TCI-state on the same BWP as a BWP receiving the first transmission indicated by the TCI field of the DCI, and transmissions activated by the DCI other than the first transmission are based on a reference signal identical to that of the first transmission and used for determining quasi co-location of an antenna port; or a TCI state of each transmission activated by the DCI is identical to a TCI state in a latest slot in the same BWP as a BWP receiving the transmission indicated by the TCI field of the DCI.

In an even further implementation, the transmission is a semi-persistently scheduled downlink transmission, the activation signaling is a DCI scrambled by CS-RNTI, the DCI containing a TCI field, a scheduling distance between the activation signaling and a first transmission activated by the activation signaling is less than a preset threshold, and the transmission unit 502 receives the semi-persistently scheduled downlink transmission based on an understanding that:

for transmissions activated by the DCI, a TCI state of transmissions before the preset threshold is identical to a TCI state of a CORESET of a lowest index in an activated BWP in a latest slot, a TCI state of a first transmission after the preset threshold is determined by a TCI state on the same BWP as a BWP receiving the first transmission indicated by the TCI field of the DCI, and transmissions after the preset threshold other than the first transmission are based on a reference signal identical to that of the first transmission and used for determining quasi co-location of an antenna port; or for transmissions activated by the DCI, a TCI state of transmissions before the preset threshold is identical to a TCI state of a CORESET of a lowest index in an activated BWP in a latest slot, a TCI state of each transmission after the preset threshold is determined by a TCI state in a latest slot in the same BWP as a BWP receiving the first transmission indicated by the TCI field of the DCI; or a TCI state of each transmission activated by the DCI is identical to a TCI state of a CORESET of a lowest index in an activated BWP in a latest slot and in the same cell as the DCI.

In yet another implementation, the transmission is a semi-persistently scheduled uplink transmission, the activation signaling is RRC signaling, the transmission is an uplink transmission of type 1, and the transmission unit 502 transmits the semi-persistently scheduled uplink transmission based on an understanding that:

a spatial relationship of a first transmission activated by the RRC signaling is determined according to srs-ResourceIndicator in rrc-ConfiguredUplinkGrant in the RRC signaling, and a reference signal which denotes a spatial relationship and on which transmissions activated by the RRC signaling other than the first transmission are based is identical to a reference signal which denotes a spatial relationship and on which the first transmission is based; or a spatial relationship of a first transmission activated by the RRC signaling is determined according to srs-ResourceIndicator in rrc-ConfiguredUplinkGrant in the RRC signaling, and spatial domain filters used by transmissions activated by the RRC signaling other than the first transmission are identical to a spatial domain filter used by the first transmission; or a spatial relationship of each transmission activated by the RRC signaling is determined according to a spatial relationship in a latest slot indicating an SRS resource by srs-ResourceIndicator in rrc-ConfiguredUplinkGrant in the RRC signaling.

In still another implementation, the transmission is a semi-persistently scheduled uplink transmission, the transmission is an uplink transmission of type 1, the activation signaling is RRC signaling, and there exits an information element in rrc-ConfiguredUplinkGrant in the RRC signaling indicating whether there exists srs-ResourceIndicator;

and when the information element is set to be enabled, the transmission unit 502 transmits the semi-persistently scheduled uplink transmission based on an understanding that:

a spatial relationship of a first transmission activated by the RRC signaling is determined according to srs-ResourceIndicator in rrc-ConfiguredUplinkGrant in the RRC signaling, and a reference signal which denotes a spatial relationship and on which transmissions activated by the RRC signaling other than the first transmission are based is identical to a reference signal which denotes a spatial relationship and on which the first transmission is based; or a spatial relationship of a first transmission activated by the RRC signaling is determined according to srs-ResourceIndicator in rrc-ConfiguredUplinkGrant in the RRC signaling, and spatial domain filters used by transmissions activated by the RRC signaling other than the first transmission are identical to a spatial domain filter used by the first transmission; or a spatial relationship of each transmission activated by the RRC signaling is determined according to a spatial relationship in a latest slot indicating an SRS resource by srs-ResourceIndicator in rrc-ConfiguredUplinkGrant in the RRC signaling;

and when the information element is set to be disabled, the transmission unit 502 transmits the semi-persistently scheduled uplink transmission based on an understanding that:

a spatial relationship of a first transmission activated by the RRC signaling is determined according to a spatial direction of an uplink control channel of a lowest index in an activated BWP in the same cell as the uplink transmission, and a reference signal which denotes a spatial relationship and on which transmissions activated by the RRC signaling other than the first transmission are based is identical to a reference signal which denotes a spatial relationship and on which the first transmission is based; or a spatial relationship of a first transmission activated by the RRC signaling is determined according to a spatial direction of an uplink control channel of a lowest index in an activated BWP in the same cell as the uplink transmission, and spatial domain filters used by transmissions activated by the RRC signaling other than the first transmission are identical to a spatial domain filter used by the first transmission; or a spatial relationship of each transmission activated by the RRC signaling is identical to a spatial relationship in a latest slot for an uplink control channel of a lowest index in an activated BWP in the same cell as the uplink transmission.

In even still another implementation, the transmission is a semi-persistently scheduled uplink transmission, the transmission is an uplink transmission of type 1, the activation signaling is RRC signaling, srs-ResourceIndicator of the RRC signaling containing a field indicating that there exists no SRI, and the transmission unit 502 transmits the semi-persistently scheduled uplink transmission based on an understanding that:

a spatial relationship of a first transmission activated by the RRC signaling is determined according to a spatial direction of an uplink control channel of a lowest index in an activated BWP in the same cell as the uplink transmission, and a reference signal which denotes a spatial relationship and on which transmissions activated by the RRC signaling other than the first transmission are based is identical to a reference signal which denotes a spatial relationship and on which the first transmission is based; or a spatial relationship of a first transmission activated by the RRC signaling is determined according to a spatial direction of an uplink control channel of a lowest index in an activated BWP in the same cell as the uplink transmission, and spatial domain filters used by transmissions activated by the RRC signaling other than the first transmission are identical to a spatial domain filter used by the first transmission; or a spatial relationship of each transmission activated by the RRC signaling is identical to a spatial relationship in a latest slot for an uplink control channel of a lowest index in an activated BWP in the same cell as the uplink transmission.

In yet still another implementation, the transmission is a semi-persistently scheduled uplink transmission, the transmission is an uplink transmission of type 2, the activation signaling is of a DCI format 0_0 scrambled by CS-RNTI, and the transmission unit 502 transmits the semi-persistently scheduled uplink transmission based on an understanding that:

a spatial relationship of a first transmission activated by the DCI is determined according to a spatial direction of an uplink control channel of a lowest index in an activated BWP in the same cell as the DCI, and a reference signal which denotes a spatial relationship and on which transmissions activated by the DCI other than the first transmission are based is identical to a reference signal which denotes a spatial relationship and on which the first transmission is based; or a spatial relationship of a first transmission activated by the DCI is determined according to a spatial direction of an uplink control channel of a lowest index in an activated BWP in the same cell as the DCI, and spatial domain filters used by transmissions activated by the DCI other than the first transmission are identical to a spatial domain filter used by the first transmission; or a spatial relationship of each transmission activated by the DCI is identical to a spatial relationship in a latest slot for an uplink control channel of a lowest index on an BWP in the same cell as the DCI.

In a further implementation, the transmission is a semi-persistently scheduled uplink transmission, the transmission is an uplink transmission of type 2, the activation signaling is of a DCI format 0_1 scrambled by CS-RNTI, and the transmission unit 502 transmits the semi-persistently scheduled uplink transmission based on an understanding that:

a first transmission activated by the DCI is transmitted according to a spatial relationship indicated by a carrier indicator field and an SRI field of the DCI, and a reference signal which denotes a spatial relationship and on which transmissions activated by the DCI other than the first transmission are based is identical to a reference signal which denotes a spatial relationship and on which transmitting the first transmission is based; or a first transmission activated by the DCI is transmitted according to a spatial relationship indicated by a carrier indicator field and an SRI field of the DCI, and spatial domain filters used by transmissions activated by the DCI other than the first transmission are identical to a spatial domain filter used by the first transmission; or a spatial relationship of each transmission activated by the DCI is identical to a spatial relationship in a latest slot indicated by the DCI.

In a further implementation, the transmission is a semi-persistently scheduled uplink transmission and is a semi-persistent CSI report based on an uplink data channel, the activation signaling is of a DCI format 0_1 scrambled by SP-CSI-RNTI, and the transmission unit 502 transmits the semi-persistently scheduled uplink transmission based on an understanding that:

a first transmission activated by the DCI is transmitted according to a spatial relationship indicated by a carrier indicator field and an SRI field of the DCI, and a reference signal which denotes a spatial relationship and on which transmissions activated by the DCI other than the first transmission are based is identical to a reference signal which denotes a spatial relationship and on which transmitting the first transmission is based; or a first transmission activated by the DCI is transmitted according to a spatial relationship indicated by a carrier indicator field and an SRI field of the DCI, and spatial domain filters used by transmissions activated by the DCI other than the first transmission are identical to a spatial domain filter used by the first transmission; or a spatial relationship of each transmission activated by the DCI is identical to a spatial relationship in a latest slot indicated by the DCI.

In a further implementation, the transmission is a semi-persistently scheduled uplink transmission and is a semi-persistent CSI report based on an uplink control channel, the activation signaling is an MAC-CE, and the transmission unit 502 transmits the semi-persistently scheduled uplink transmission based on an understanding that:

a first transmission activated by the MAC-CE is transmitted according to a spatial relationship of a control channel configured by RRC, and a reference signal which denotes a spatial relationship and on which transmissions activated by the MAC-CE other than the first transmission are based is identical to a reference signal which denotes a spatial relationship and on which transmitting the first transmission is based; or a first transmission activated by the MAC-CE is transmitted according to a spatial relationship of a control channel configured by RRC, and spatial domain filters used by transmissions activated by the MAC-CE other than the first transmission are identical to a spatial domain filter used by the first transmission; or a spatial relationship of each transmission activated by the MAC-CE is identical to a spatial relationship of an applied associated control channel in a latest slot.

In a further implementation, the transmission is a semi-persistently scheduled uplink transmission and is a semi-persistent CSI report based on an uplink control channel, the activation signaling is an MAC-CE, the terminal equipment is switched over from a first BWP to another BWP and is switched back to the first BWP, and the transmission unit 502 transmits the semi-persistently scheduled uplink transmission based on an understanding that:

a first transmission activated by the MAC-CE is transmitted according to a spatial relationship of a control channel configured by RRC, and a reference signal which denotes a spatial relationship and on which transmissions activated by the MAC-CE other than the first transmission are based is identical to a reference signal which denotes a spatial relationship and on which the first transmission is based; or a first transmission activated by the MAC-CE is transmitted according to a spatial relationship of a control channel configured by RRC, and spatial domain filters used by transmissions activated by the MAC-CE other than the first transmission are identical to a spatial domain filter used by the first transmission; or a spatial relationship of each transmission activated by the MAC-CE is identical to a spatial relationship of an applied associated control channel in a latest slot; or a first transmission activated by the MAC-CE is transmitted according to a spatial relationship for recently transmitting the transmission on the first BWP, and a reference signal which denotes a spatial relationship and on which transmissions activated by the MAC-CE other than the first transmission are based is identical to a reference signal which denotes a spatial relationship and on which the first transmission is based; or a first transmission activated by the MAC-CE is transmitted according to a spatial relationship for recently transmitting the transmission on the first BWP, and spatial domain filters used by transmissions activated by the MAC-CE other than the first transmission are identical to a spatial domain filter used by the first transmission.

In a further implementation, the transmission is a periodic CSI report based on uplink transmission, the activation signaling is RRC signaling, and the transmission unit 502 transmits the transmission based on an understanding that:

a first transmission activated by the RRC signaling is transmitted according to a spatial relationship of a control channel configured by RRC, and a reference signal which denotes a spatial relationship and on which transmissions activated by the RRC signaling other than the first transmission are based is identical to a reference signal which denotes a spatial relationship and on which the first transmission is based; or a first transmission activated by the RRC signaling is transmitted according to a spatial relationship of a control channel configured by RRC, and spatial domain filters used by transmissions activated by the RRC signaling other than the first transmission are identical to a spatial domain filter used by the first transmission; or a spatial relationship of each transmission activated by the RRC signaling is identical to an applied spatial relationship of an associated control channel in a latest slot.

With the apparatus of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 4

This embodiment provides a beam indication apparatus, configured in a network device. As principles of the apparatus for solving problems are similar to that of the method in Embodiment 2, reference may be made to the implementation of the method in Embodiment 2 for implementation of this apparatus, with identical contents being not going to be described herein any further.

Figure 6:
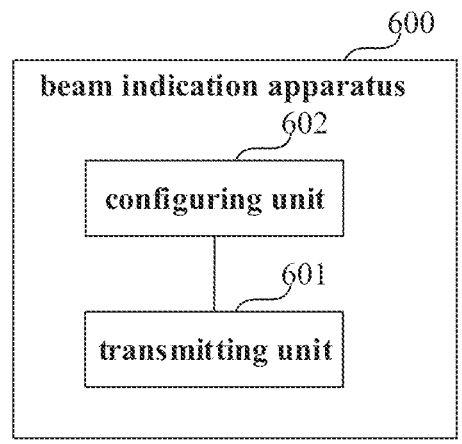
FIG. 6 is a schematic diagram of the beam indication apparatus of Embodiment 4.

FIG. 6 is a schematic diagram of the beam indication apparatus of this embodiment. As shown in FIG. 6, a beam indication apparatus 600 includes:

a transmitting unit 601 configured to transmit activation signaling to a terminal equipment, the activation signaling activating at least one transmission of the terminal equipment, so that the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

In this embodiment, the activation signaling may be a DCI scrambled by CS-RNTI, or a DCI scrambled by SP-CSI-RNTI, or an MAC-CE, or is RRC configuration; and the transmission may be a semi-persistently scheduled downlink transmission, or a semi-persistently scheduled uplink transmission, or a periodic channel state information (CSI) report based on uplink transmission. As the activation signaling and the transmissions activated by the activation signaling have been described in detail in Embodiment 1, their contents are incorporated herein, and shall not be described herein any further.

In this embodiment, as shown in FIG. 6, the beam indication apparatus 600 may further include:

a configuring unit 602 configured to configure semi-persistently scheduled parameters or periodically scheduled parameters for the terminal equipment via RRC signaling.

In this embodiment, the above RRC signaling may include an information element r-ConfiguredUplinkGrant, and the information element rrc-ConfiguredUplinkGrant may include an information element used for indicating whether srs-ResourceIndicator exists. Therefore, corresponding to the first variant of implementation 5 of Embodiment 1, the terminal equipment may determine the beam indication accordingly.

In this embodiment, the above RRC signaling may further include an information element srs-ResourceIndicator, and the information element srs-ResourceIndicator may include a field used for indicating whether the SRI exists. Therefore, corresponding to the second variant of implementation 5 of Embodiment 1, the terminal equipment may determine the beam indication accordingly.

With the apparatus of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 5

The embodiment of this disclosure provides a terminal equipment, including the apparatus described in Embodiment 3.

Figure 7:
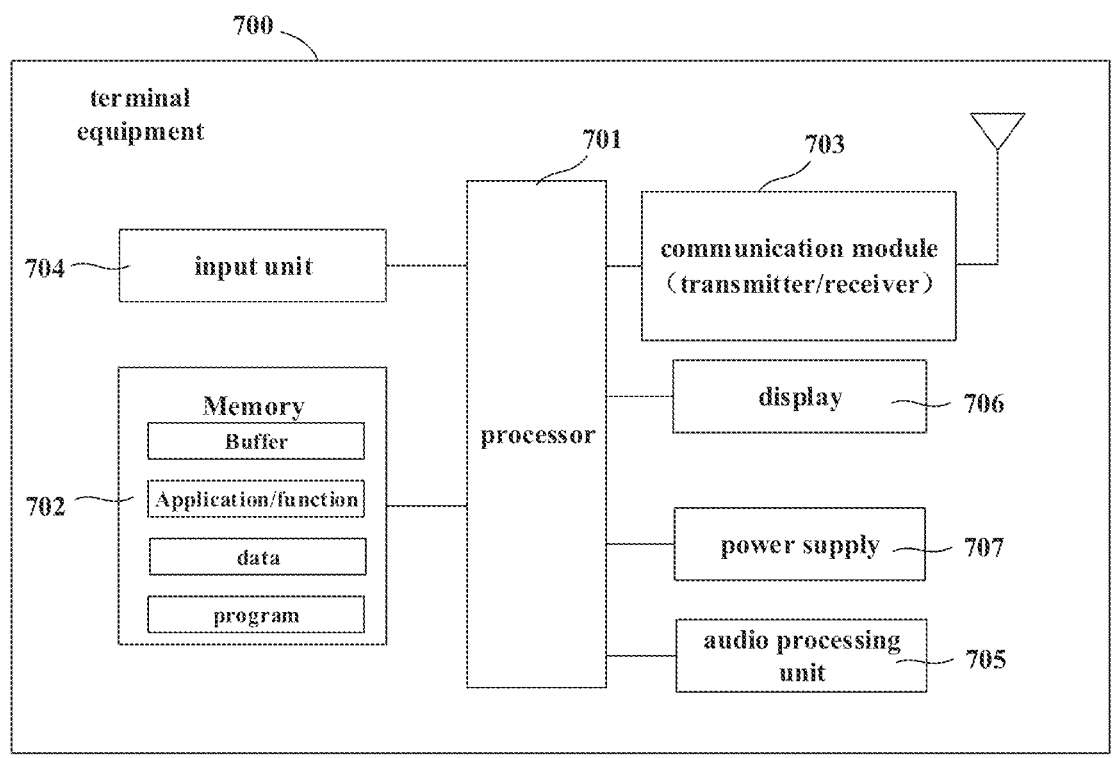
FIG. 7 is a schematic diagram of the terminal equipment of Embodiment 5.

FIG. 7 is a schematic diagram of the terminal equipment of this embodiment. As shown in FIG. 7, a terminal equipment 700 may include a central processing unit 701 and a memory 702, the memory 702 being coupled to the central processing unit 701. It should be noted that his figure is illustrative only, and other types of structures may also be used, so as to supplement or replace this structure and achieve a telecommunications function or other functions.

In one implementation, the functions of the apparatus as described in Embodiment 3 may be integrated into the central processing unit 701, and the central processing unit 701 executes the functions of the apparatus described in Embodiment 3. The functions of the apparatus described in Embodiment 3 are incorporated herein, and shall not be described herein any further.

In another implementation, the apparatus as described in Embodiment 3 and the central processing unit 701 may be configured separately; for example, the apparatus as described in Embodiment 3 may be configured as a chip connected to the central processing unit 701, and the functions of the apparatus as described in Embodiment 3 are achieved under control of the central processing unit 701.

As shown in FIG. 7, the terminal equipment 700 may further include a communication module 703, an input unit 704, an audio processing unit 705, a display 706, and a power supply 707. It should be noted that the terminal equipment 700 does not necessarily include all the parts shown in FIG. 7. Furthermore, the terminal equipment 700 may include parts not shown in FIG. 7, and the related art may be referred to.

As shown in FIG. 7, the central processing unit 701 is sometimes referred to as a controller or control, which may include a microprocessor or other processor devices and/or logic devices, and the central processing unit 701 receives input and controls operations of every component of the terminal equipment 700.

The memory 702 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 701 may execute programs stored in the memory 702, so as to realize information storage or processing, etc. Functions of other parts are similar to those of the related art, which shall not be described herein any further. The parts of the terminal equipment 700 may be realized by specific hardware, firmware, software, or any combination thereof, without departing from the scope of this disclosure.

With the terminal equipment of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 6

The embodiment of this disclosure provides a network device, including the apparatus described in Embodiment 4.

Figure 8:
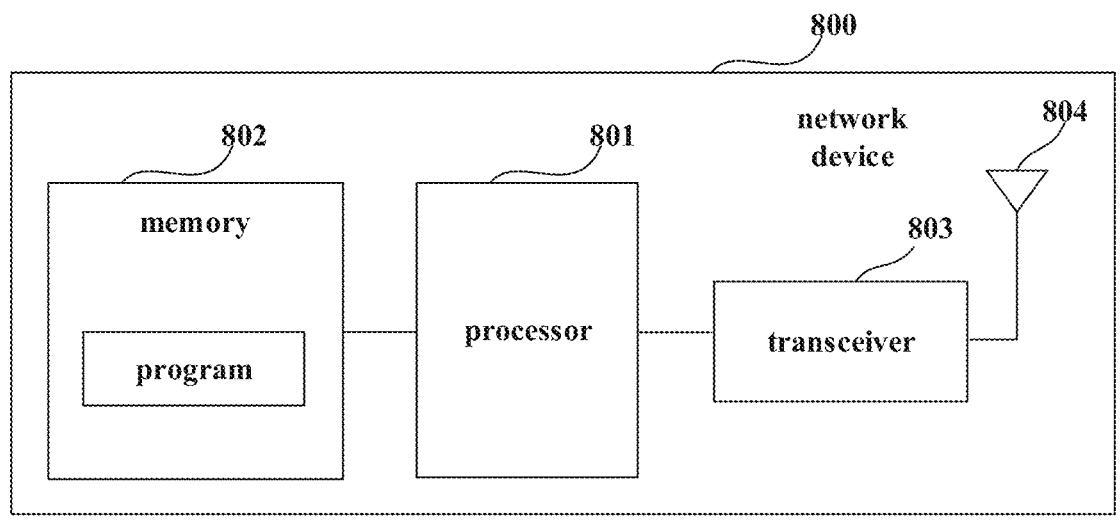
FIG. 8 is a schematic diagram of the network device of Embodiment 6.

FIG. 8 is a schematic diagram of a structure of an implementation of the network device of the embodiment of this disclosure. As shown in FIG. 8, a network device 800 may include a central processing unit (CPU) 801 and a memory 802, the memory 802 being coupled to the central processing unit 801. The memory 802 may store various data, and furthermore, it may store a program for information processing, and execute the program under control of the central processing unit 801, so as to receive various information transmitted by a terminal equipment and transmit various information to the terminal equipment.

In one implementation, the functions of the apparatus described in Embodiment 4 may be integrated into the central processing unit 801, and the central processing unit 801 executes the functions of the apparatus described in Embodiment 4. The functions of the apparatus described in Embodiment 4 are incorporated herein, and shall not be described herein any further.

In another implementation, the apparatus as described in Embodiment 4 and the central processing unit 801 may be configured separately; for example, the apparatus as described in Embodiment 4 may be configured as a chip connected to the central processing unit 801, and the functions of the apparatus as described in Embodiment 4 are achieved under control of the central processing unit 801.

Furthermore, as shown in FIG. 8, the network device 800 may include a transceiver 803, and an antenna 804, etc. Functions of the above components are similar to those in the related art, and shall not be described herein any further. It should be noted that the network device 800 does not necessarily include all the parts shown in FIG. 8. Furthermore, the network device 800 may include parts not shown in FIG. 8, and the related art may be referred to.

With the network device of this embodiment, for the semi-persistently scheduled or periodically scheduled transmission, between activation signaling and deactivation signaling or a next time of activation signaling, identical spatial domain filters or transmission hypotheses or respective spatial domain filters or transmission hypotheses determined by dynamically interpreting the activation signaling may be used by the terminal equipment for transmission or reception, thereby solving the problem of ambiguity of beam indication in the above time period.

Embodiment 7

The embodiment of this disclosure provides a communication system, including a network device and a terminal equipment, the network device being, for example, the network device 800 described in Embodiment 6, and the terminal equipment being, for example, the terminal equipment 700 described in Embodiment 5.

In this embodiment, the terminal equipment is, for example, a UE served by a gNB, and includes conventional compositions and functions of a terminal equipment in addition to the functions of the apparatus described in Embodiment 3, which are as described in Embodiment 5, and shall not be described herein any further.

In this embodiment, the network device may be, for example, a gNB in NR, and includes conventional compositions and functions of a network device in addition to the functions of the apparatus described in Embodiment 4, which are as described in Embodiment 6, and shall not be described herein any further.

With the communication system of this embodiment, the problem of ambiguity of beam indication of semi-persistent scheduling or other scheduling between the activation signaling and deactivation signaling or a next time of activation signaling is solved.

An embodiment of the present disclosure provides a computer readable program, which, when executed in a terminal equipment, will cause a computer to carry out the method as described in Embodiment 1 in the terminal equipment.

An embodiment of the present disclosure provides a storage medium storing a computer readable program, which will cause a computer to carry out the method as described in Embodiment 1 in a terminal equipment.

An embodiment of the present disclosure provides a computer readable program, which, when executed in a network device, will cause a computer to carry out the method as described in Embodiment 2 in the network device.

An embodiment of the present disclosure provides a storage medium storing a computer readable program, which will cause a computer to carry out the method as described in Embodiment 2 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The service reception or transmission method or measurement method carried out in the service reception or transmission apparatus or measurement apparatus described with reference to the embodiments of this disclosure may be directly embodied as hardware, software modules executed by a processor, or a combination thereof. For example, one or more functional block diagrams and/or one or more combinations of the functional block diagrams shown in the drawing may either correspond to software modules of procedures of a computer program, or correspond to hardware modules. Such software modules may respectively correspond to the steps shown in the drawing. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawing may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawing may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A beam indication apparatus, configured in a network device, wherein the apparatus includes:

a transmitting unit configured to transmit activation signaling to a terminal equipment, the activation signaling activating at least one transmission of the terminal equipment, so that the terminal equipment transmits or receives the at least one transmission based on an understanding that: before receiving deactivation signaling or a next time of activation signaling, all transmissions activated by the activation signaling use identical spatial domain filters or transmission hypotheses, or use respective spatial domain filters or transmission hypotheses determined by dynamically interpreting the activation signaling.

2. The apparatus according to supplement 1, wherein the activation signaling is a DCI scrambled by CS-RNTI, or is a DCI scrambled by SP-CSI-RNTI, or is an MAC-CE, or is RRC configuration;

3. The apparatus according to supplement 1, wherein the transmission is a semi-persistently scheduled downlink transmission, or is a semi-persistently scheduled uplink transmission, or is a periodic channel state information (CSI) report based on uplink transmission.

4. The apparatus according to supplement 1, wherein the apparatus further includes:

a configuring unit configured to configure semi-persistently scheduled parameters or periodically scheduled parameters for the terminal equipment via RRC signaling.

5. The apparatus according to supplement 4, wherein the RRC signaling includes an information element rrc-ConfiguredUplinkGrant, and the information element rrc-ConfiguredUplinkGrant includes an information element used for indicating whether srs-ResourceIndicator exists.

6. The apparatus according to supplement 4, wherein the RRC signaling includes an information element srs-ResourceIndicator, and the information element srs-ResourceIndicator includes a field used for indicating whether the SRI exists.

What is claimed is:

1. An apparatus related to beam indication, configured in a terminal equipment, the apparatus comprising:
a memory that stores a plurality of instructions; and
a processor that couples to the memory and is configured to execute the instructions to:
receive a downlink control information (DCI) format, wherein the DCI format schedules more than one receptions for a physical down link shared channel (PDSCH); and
receive the more than one receptions for the PDSCH based on an understanding that
activated transmission configuration indicator (TCI) states for all of the more than one receptions for the PDSCH are identical.

2. The apparatus according to claim 1, wherein
in a case where a scheduling distance between the DCI format and an earliest reception of the more than one receptions is greater than a preset threshold, the earliest reception is based on a TCI state indicated by the DCI format, and the more than one receptions other than the earliest reception are based on TCI states identical to that of the earliest reception.

3. The apparatus according to claim 1, wherein the DCI format is scrambled by configured scheduling radio network temporary identifier (CS-RNTI), or is scrambled by semi-persistent scheduling-channel state information-radio network temporary identifier (SP-CSI-RNTI).

4. The apparatus according to claim 1, wherein the more than one receptions are semi-persistently scheduled downlink transmission, the DCI format is scrambled by configured scheduling radio network temporary identifier (CS-RNTI), the DCI containing no TCI field, a scheduling distance between the DCI format and an earliest reception a is greater than a preset threshold, and the processor is configured to receive the semi-persistently scheduled downlink transmission based on an understanding that:

a TCI state of the earliest reception is identical to a TCI state used by a control resource set (CORESET) carrying the DCI, and the more than one receptions other than the earliest reception are based on a TCI state identical to that of the earliest reception; or a TCI state of each reception of the more than one receptions indicated by the DCI is identical to a TCI state used by a CORESET in a latest slot, the CORESET referring to a CORESET carrying the DCI if the CORESET carrying the DCI exists, or the CORESET referring to a CORESET of a lowest index in an activated bandwidth part (BWP) located in the same cell as the DCI if the CORESET carrying the DCI does not exist.

5. The apparatus according to claim 1, wherein the more than one receptions are semi-persistently scheduled downlink transmission, the DCI format is scrambled by configured scheduling radio network temporary identifier (CS-RNTI), the DCI containing no TCI field, a scheduling distance between the DCI format and an earliest reception is less than a preset threshold, and the processor is configured to receive the semi-persistently scheduled downlink transmission based on an understanding that:

for the more than one receptions, a TCI state of receptions before the preset threshold is identical to a TCI state of a control resource set (CORESET) of a lowest index in an activated BWP in a latest slot, a TCI state of the earliest reception after the preset threshold is identical to the TCI state of the CORESET carrying the DCI, and the more than one receptions other than the earliest reception are based on a TCI state identical to that of the earliest reception; or for the more than one receptions indicated by the DCI, a TCI state of receptions before the preset threshold is identical to a TCI state of a CORESET of a lowest index in an activated BWP in a latest slot, a TCI state of receptions after the preset threshold is identical to a TCI state of a CORESET in a latest slot, the CORESET referring to a CORESET carrying the DCI, or the CORESET referring to a CORESET of a lowest index in an activated BWP located in the same cell as the DCI if the CORESET carrying the DCI does not exist; or a TCI state of each reception of the more than one receptions is identical to a TCI state of a CORESET of a lowest index in an activated BWP in a latest slot and in the same cell as the DCI.

6. The apparatus according to claim 1, wherein the more than one receptions are semi-persistently scheduled downlink transmission, the DCI format is scrambled by configured scheduling radio network temporary identifier (CS-RNTI), the DCI containing a TCI field, a scheduling distance between the DCI format and an earliest reception indicated by the DCI format is greater than a preset threshold, and the processor is configured to receive the semi-persistently scheduled downlink transmission based on an understanding that:

a TCI state of the earliest reception is determined according to the activated TCI states on the same BWP for receiving the earliest reception, and the more than one receptions other than the earliest reception are based on a TCI state identical to that of the earliest reception; or a TCI state of each reception of the more than one receptions is according to activated TCI states for the slot for the corresponding reception.

7. The apparatus according to claim 1, wherein the more than one receptions are semi-persistently scheduled downlink transmission, the DCI format is scrambled by configured scheduling radio network temporary identifier (CS-RNTI), the DCI containing a TCI field, a scheduling distance between the DCI format and an earliest reception indicated by the DCI format is less than a preset threshold, and the processor is configured to receive the semi-persistently scheduled downlink transmission based on an understanding that:

for the more than one receptions, a TCI state of the more than one receptions before the preset threshold is identical to a TCI state of a control resource set (CORESET) of a lowest index in an activated BWP in a latest slot, a TCI state of the earliest reception after the preset threshold is determined according to activated TCI states on the same BWP for receiving the earliest reception, and the more than one receptions after the preset threshold other than the earliest reception are based on a TCI state identical to that of the earliest reception; or for more than one receptions, a TCI state of more than one receptions before the preset threshold is identical to a TCI state of a CORESET of a lowest index in an activated BWP in a latest slot, a TCI state of each reception of the more than one receptions after the preset threshold is according to activated TCI states for the slot for the earliest reception; or a TCI state of each reception of the more than one receptions is identical to a TCI state of a CORESET of a lowest index in an activated BWP in a latest slot and in the same cell as the DCI.

8. An apparatus related to beam indication, configured in a network device, the apparatus comprising:
a memory that stores a plurality of instructions; and
a processor that couples to the memory and is configured to execute the instructions to:
transmit downlink control information (DCI) format to a terminal equipment, the DCI format schedules more than one receptions for a physical down link shared channel (PDSCH) of the terminal equipment, so that the terminal equipment receives the more than one receptions for the PDSCH based on an understanding that activated transmission configuration indicator (TCI) states for all of the more than one receptions for the PDSCH are identical.

9. The apparatus according to claim 8, wherein,
the DCI format is scrambled by configured scheduling radio network temporary identifier (CS-RNTI), or is scrambled by semi-persistent scheduling-channel state information-radio network temporary identifier (SP-CSI-RNTI).

* * * * *